US009426460B2

(12) United States Patent
Deshpande

(10) Patent No.: US 9,426,460 B2
(45) Date of Patent: Aug. 23, 2016

(54) ELECTRONIC DEVICES FOR SIGNALING MULTIPLE INITIAL BUFFERING PARAMETERS

(71) Applicant: SHARP KABUSHIKI KAISHA, Osaka-shi, Osaka (JP)

(72) Inventor: Sachin G. Deshpande, Camas, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 241 days.

(21) Appl. No.: 14/035,215

(22) Filed: Sep. 24, 2013

(65) Prior Publication Data

US 2014/0023146 A1    Jan. 23, 2014

Related U.S. Application Data

(63) Continuation-in-part of application No. 13/447,095, filed on Apr. 13, 2012.

(60) Provisional application No. 61/707,699, filed on Sep. 28, 2012.

(51) Int. Cl.
*H04N 21/00* (2011.01)
*H04N 19/169* (2014.01)
*H04L 29/06* (2006.01)
*H04N 21/44* (2011.01)
(Continued)

(52) U.S. Cl.
CPC ...... *H04N 19/00254* (2013.01); *H04L 65/602* (2013.01); *H04N 19/169* (2014.11); *H04N 21/44004* (2013.01); *H04N 21/6336* (2013.01); *H04N 21/6547* (2013.01)

(58) Field of Classification Search
CPC ............... H04N 7/50; H04N 7/26941; H04N 21/2365; H04N 21/4347; H04N 7/26244
See application file for complete search history.

(56) References Cited

U.S. PATENT DOCUMENTS 8,406,292 B2 *   3/2013  Shimada ............. G11B 27/034
                                                 375/240.01
8,699,581 B2 *   4/2014  Koyabu .............. G11B 27/005
                                                 375/240.12
(Continued)

OTHER PUBLICATIONS

Ribas-Corbera et al. A Generalized Hypothetical Reference Decoder for H.264/AVC; IEEE Transactions on Circuits and Systems for Video Technology, vol. 13, No. 7, July 2003.*
(Continued)

*Primary Examiner* — Jay Patel
*Assistant Examiner* — Frank Huang
(74) *Attorney, Agent, or Firm* — Birch, Stewart, Kolasch & Birch, LLP

(57) ABSTRACT

An electronic device for sending a message is described. The electronic device includes a processor and instructions stored in memory that is in electronic communication with the processor. The electronic device determines whether a picture is a random access point (RAP) picture. The electronic device also determines whether the picture is associated with a broken link access (BLA) with decodable leading pictures (DLP) network access layer (NAL) unit type if the picture is a RAP picture. The electronic device further generates a message including a RAP coded picture buffer (CPB) parameter flag and an initial additional CPB removal delay parameter if the BLA with DLP NAL unit type is present. The electronic device additionally sends the message.

1 Claim, 16 Drawing Sheets

(51) Int. Cl.
*H04N 21/6336* (2011.01)
*H04N 21/6547* (2011.01)

(56) References Cited

U.S. PATENT DOCUMENTS

| | | | |
|---|---|---|---|
| 2006/0120463 | A1 | 6/2006 | Wang |
| 2010/0130136 | A1* | 5/2010 | Sepehri-Nik .......... G06Q 30/02 455/67.11 |
| 2010/0167689 | A1* | 7/2010 | Sepehri-Nik ....... H04M 3/5158 455/405 |
| 2013/0272430 | A1* | 10/2013 | Sullivan ................ H04N 19/70 375/240.26 |

OTHER PUBLICATIONS

Y.-K. Wang, Y. Chen, M. Karczewicz, J. Chen, "On bitstreams starting with CRA pictures," JCTVC-H0496 8th Meeting: San Jose, USA, Feb. 1-10, 2012.

JCTVC-H1003_dK, "High efficiency video coding (HEVC) text specification draft 6," Feb. 2012.

JCTVC-J1003_d7, "High efficiency video coding (HEVC) text specification draft 8," Jul. 2012.

JCTVC-F759, "Report of the BoG on clean random access (CRA) picture," Ye-Kui Wang, Joint Collaborative Team on Video Coding (JCT-VC) of ITU-T SG16 WP3 and ISO/IEC JTC1/SC29/WG11 6th Meeting: Torino, IT, Jul. 14-22, 2011.

JCTVC-D234, "Random access support for HEVC," Akira Fujibayashi, Joint Collaborative Team on Video Coding (JCT-VC) of ITU-T SG16 WP3 and ISO/IEC JTC1/SC29/WG11 4th Meeting: Daegu, Korea, Jan. 20-28, 2011.

JCTVC-0500, "Common test conditions and software reference configurations," Frank Bossen, Joint Collaborative Team on Video Coding (JCT-VC) of ITU-T SG16 WP3 and ISO/IEC JTC1/SC29/WG11 3rd Meeting: Guangzhou, CN, Oct. 7-15, 2010.

International Search Report issued for International Patent Application No. PCT/JP2013/002531 on Jul. 16, 2013.

US Office Action for co-pending U.S. Appl. No. 13/447,095 dated Sep. 22, 2015.

Sachin Deshpande et al., "HRD Buffering for Bitstreams Starting with CRA Picture", JCTVC-I0277, Geneva, Apr. 27-May 7, 2012.

* cited by examiner

ELECTRONIC DEVICES FOR SIGNALING MULTIPLE INITIAL BUFFERING PARAMETERS

RELATED APPLICATION

This application is related to and claims priority from U.S. Provisional Patent Application No. 61/707,699 entitled "ELECTRONIC DEVICES FOR SIGNALING MULTIPLE INITIAL BUFFERING PARAMETERS," filed on Sep. 28, 2012, which is incorporated herein by reference.

This application is a continuation-in-part of U.S. patent application Ser. No. 13/447,095, entitled "ELECTRONIC DEVICES FOR SENDING A MESSAGE AND BUFFERING A BITSTREAM" filed on Apr. 13, 2012, which is incorporated herein by reference.

TECHNICAL FIELD

The present disclosure relates generally to electronic devices. More specifically, the present disclosure relates to electronic devices for signaling multiple initial buffering parameters for random access.

BACKGROUND

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and rapid playback presents several challenges. As can be observed from this discussion, systems and methods that represent digital media efficiently with improved performance may be beneficial.

DETAILED DESCRIPTION

Figure 1:
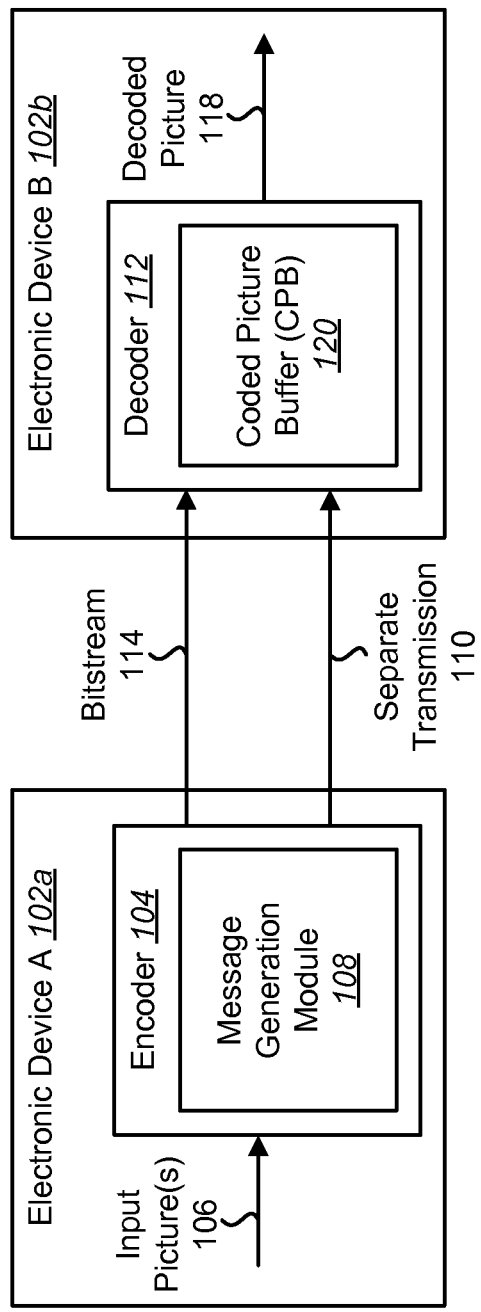
FIG. 1 is a block diagram illustrating an example of one or more electronic devices in which systems and methods for sending a message and buffering a bitstream may be implemented.

An electronic device for sending a message is described. The electronic device includes a processor and instructions stored in memory that is in electronic communication with the processor. The electronic device determines whether a picture is a random access point (RAP) picture. The electronic device also determines whether the picture is associated with a broken link access (BLA) with decodable leading pictures (DLP) network access layer (NAL) unit type if the picture is a RAP picture. The electronic device further generates a message including a RAP coded picture buffer (CPB) parameter flag and an initial additional CPB removal delay parameter if the BLA with DLP NAL unit type is present. The electronic device additionally sends the message.

The electronic device may determine whether the RAP picture is a BLA picture. The initial additional CPB removal delay parameter may be an initial_alt1_cpb_removal_delay[SchedSelIdx], SchedSelIdx may be an index variable. The RAP CPB parameter flag may be a rap_cpb_params_present_flag. The RAP CPB parameter flag may be a new parameter flag.

The electronic device may generate an initial additional CPB removal delay offset parameter if the BLA with DLP NAL unit type is present. The BLA with DLP NAL unit type may indicate that no associated tagged for discard (TFD) pictures are present in the bitstream associated with the BLA picture. The BLA with DLP NAL unit type may be BLA_W_DLP. The message may be a buffering period supplemental enhancement information (SEI) message.

An electronic device for buffering a bitstream is also described. The electronic device includes a processor and instructions stored in memory that is in electronic communication with the processor. The electronic device receives a message. The electronic device also determines whether a RAP CPB parameter flag indicates an initial additional CPB removal delay parameter. The electronic device further performs an operation based on the initial additional CPB removal delay parameter.

The initial additional CPB removal delay parameter may be an initial_alt1_cpb_removal_delay[SchedSelIdx]. SchedSelIdx may be an index variable. The RAP CPB parameter flag may be a rap_cpb_params_present_flag. Receiving the message may include receiving a RAP CPB parameter flag, an initial additional CPB removal delay parameter and an initial additional CPB removal delay offset parameter.

The electronic device may obtain a BLA with DLP NAL unit type associated with a RAP picture from the message. The BLA with DLP NAL unit type may indicate that no associated TFD pictures are present in the bitstream associated with the BLA picture. The BLA with DLP NAL unit type may be BLA_W_DLP. The message may be a buffering period SEI message.

A method for sending a message by an electronic device is also described. The electronic device determines whether a picture is a RAP picture. The electronic device also determines whether the picture is associated with a BLA with DLP NAL unit type if the picture is a RAP picture. A message is generated including a RAP CPB parameter flag and an initial additional CPB removal delay parameter if the BLA with DLP NAL unit type is present. The message is sent.

A method for buffering a bitstream by an electronic device is also described. A message is received. The electronic device determines whether a RAP CPB parameter flag indicates an initial additional CPB removal delay parameter. An operation is performed based on the initial additional CPB removal delay parameter.

The systems and methods disclosed herein describe electronic devices for sending a message and buffering a bitstream. For example, the systems and methods disclosed herein describe buffering for bitstreams starting with a clean random access (CRA) picture. In some configurations, the systems and methods disclosed herein may describe hypothetical reference decoder (HRD) buffering for bitstreams starting with a CRA picture. For instance, the systems and methods disclosed herein describe modification to a buffering period supplemental enhancement information (SEI) message and to an HRD for bitstreams starting with CRA pictures when leading pictures are present. The systems and methods disclosed herein (e.g., the HRD modification) may provide a benefit of reducing initial buffering latency when starting playback at a CRA picture at a random access point. The random access point may be any point in a stream of data (e.g., bitstream) where decoding of the bitstream does not require access to any point in a bitstream preceding the random access point to decode a current picture and all pictures subsequent to said current picture in output order. Also, the systems and methods disclosed herein may provide a benefit that the HRD will not underflow when one or more leading pictures after a CRA picture are discarded.

It should be noted that although the term "hypothetical" is used in reference to an HRD, the HRD may be physically implemented. For example, "HRD" may be used to describe an implementation of an actual decoder. In some configurations, an HRD may be implemented in order to determine whether a bitstream conforms to High Efficiency Video Coding (HEVC) specifications. For instance, an HRD may be used to determine whether Type I bitstreams and Type II bitstreams conform to HEVC specifications. A Type I bitstream may contain only Video Coding Layer (VCL) network access layer (NAL) units and filler data NAL units. A Type II bitstream may contain additional other NAL units and syntax elements.

Joint Collaborative Team on Video Coding (JCTVC) document JCTVC-H0496 proposes bitstreams starting with CRA pictures. This functionality has been incorporated into the High Efficiency Video Coding (HEVC) Committee Draft (JCTVC-J1003).

One example of modified syntax and semantics in accordance with the systems and methods disclosed herein is given in Table (1) as follows. Modifications in accordance with the systems and methods disclosed herein are denoted in bold.

TABLE (1)

```
buffering_period( payloadSize ) {
    seq_parameter_set_id
    cra_leadingpict_discard_flag
    if( NalHrdBpPresentFlag ) {
        for( SchedSelIdx = 0; SchedSelIdx <= cpb_cnt_minus1;
SchedSelIdx++ ) {
            initial_cpb_removal_delay[ SchedSelIdx ]
            initial_cpb_removal_delay_offset[ SchedSelIdx ]
            if ( cra_leadingpict_discard_flag )
            initial_cra_cpb_removal_delay[ SchedSelIdx ]
            initial_cra_cpb_removal_delay_offset[ SchedSelIdx ]
        }
    }
    if( VclHrdBpPresentFlag ) {
        for( SchedSelIdx = 0; SchedSelIdx <= cpb_cnt_minus1;
SchedSelIdx++ ) {
            initial_cpb_removal_delay[ SchedSelIdx ]
            initial_cpb_removal_delay_offset[ SchedSelIdx ]
            if ( cra_leadingpict_discard_flag )
            initial_cra_cpb_removal_delay[ SchedSelIdx ]
            initial_cra_cpb_removal_delay_offset[ SchedSelIdx ]
        }
    }
}
```

Examples regarding buffering period SEI message semantics in accordance with the systems and methods disclosed herein are given as follows. In particular, additional detail regarding the semantics of the modified syntax elements are given as follows. A cra_leadingpict_discard_flag equal to 1 indicates the presence of initial_cra_cpb_removal_delay [SchedSelIdx] and initial_cra_cpb_removal_delay_offset [SchedSelIdx] syntax elements. A cra_leadingpict_discard_ flag equal to 0 indicates the absence of the initial_cra_cpb_removal_delay[SchedSelIdx] and initial_ cra_cpb_removal_delay_offset[SchedSelIdx] syntax elements. This flag may not be 1 when the associated or corresponding picture is not a CRA picture.

initial_cra_cpb_removal_delay[SchedSelIdx] specifies the delay for the SchedSelIdx-th coded picture buffer (CPB) between the time of arrival in the CPB of the first bit of the coded data associated with the access unit associated with the buffering period SEI message and the time of removal from the CPB of the coded data associated with the same access unit, for the first buffering period after HRD initialization at a starting CRA picture when access units containing leading pictures associated with the starting CRA picture are discarded. The syntax element may have a length in bits given by initial_cpb_removal_delay_length_minus1+1. In some configurations, this syntax element is in units of a 90 kilohertz (kHz) clock.

initial_cra_cpb_removal_delay[SchedSelIdx] may not be equal to 0. Furthermore, it may not exceed 90000*(CpbSize [SchedSelIdx]÷BitRate[SchedSelIdx]), which is the time equivalent of the CPB size in 90 kHz clock units.

initial_cra_cpb_removal_delay_offset [SchedSelIdx] may be used for the SchedSelIdx-th CPB in combination with the cpb_removal_delay to specify the initial delivery time of coded access units to the CPB for a bitstream starting with a CRA picture when access units containing leading pictures associated with the starting CRA picture are discarded. In some configurations, initial_cra_cpb_removal_delay_offset [SchedSelIdx] is in units of a 90 kHz clock. The initial_ cra_cpb_removal_delay_offset[SchedSelIdx] syntax element may be a fixed length code whose length in bits is given by initial_cpb_removal_delay_length_minus1+1.

This syntax element may not be used by decoders and may be needed only for the delivery scheduler (e.g., a hypothetical stream scheduler (HSS) specified in Annex C of JCTVC-H1003). Over the entire coded video sequence, the sum of initial_cra_cpb_removal_delay[SchedSelIdx] and initial_cra_cpb_removal_delay_offset[SchedSelIdx] may be constant for each value of SchedSelIdx. SchedSelIdx may be an index variable. payloadSize may refer to bytes of data.

seq_parameter_set_id specifies the sequence parameter set that contains the sequence HRD attributes. The value of seq_parameter_set_id may be equal to the value of seq_parameter_set_id in the picture parameter set referenced by the primary coded picture associated with the buffering period SEI message. The value of seq_parameter_set_id may be in the range of 0 to 31, inclusive.

initial_cpb_removal_delay[SchedSelIdx] may specify the initial CPB removal delays for the SchedSelIdx-th CPB. The syntax element may have a length in bits given by initial_cpb_removal_delay_length_minus1+1 and may be in units of a 90 kHz clock.

initial_cpb_removal_delay[SchedSelIdx] may not be equal to 0 and may not exceed 90000*(CpbSize[SchedSelIdx]÷BitRate[SchedSelIdx]), the time-equivalent of the CPB size in 90 kHz clock units.

initial_cpb_removal_delay_offset[SchedSelIdx] may be used for the SchedSelIdx-th CPB to specify the initial delivery time of coded data units to the CPB. The syntax elements may have a length in bits given by initial_cpb_removal_delay_length_minus1+1 and may be in units of a 90 kHz clock. These syntax elements may not be used by decoders and may be needed only for the delivery scheduler (HSS) specified in Annex Error! Reference source not found. of HEVC specifications Over the entire coded video sequence, the sum of initial_cpb_removal_delay[SchedSelIdx] and initial_cpb_removal_delay_offset[SchedSelIdx] may be constant for each value of SchedSelIdx. The sum of initial_alt_cpb_removal_delay[SchedSelIdx] and initial_alt_cpb_removal_delay_offset[SchedSelIdx] may be constant for each value of SchedSelIdx.

cpb_cnt_minus1 plus 1 specifies the number of alternative CPB specifications in the bitstream. The value of cpb_cnt_minus1 may be in the range of 0 to 31, inclusive. When low_delay_hrd_flag is equal to 1, cpb_cnt_minus1 may be equal to 0. When cpb_cnt_minus1 is not present, it may be inferred to be equal to 0.

A nal_hrd_parameters_present_flag equal to 1 specifies that NAL HRD parameters (pertaining to Type II bitstream conformance) are present. A nal_hrd_parameters_present_flag equal to 0 specifies that NAL HRD parameters are not present. It should be noted that when the nal_hrd_parameters_present_flag is equal to 0, the conformance of the bitstream cannot be verified without provision of the NAL HRD parameters, including the NAL sequence HRD parameter information and all buffering period and picture timing SEI messages, by some means not specified in HEVC specifications.

When the nal_hrd_parameters_present_flag is equal to 1, NAL HRD parameters (from subclauses E.1.2 and E.2.2 of HEVC specifications, for example) immediately follow the flag. The variable NalHrdBpPresentFlag may be derived as follows. If any of the following is true, the value of NalHrdBpPresentFlag may be set equal to 1: nal_hrd_parameters_present_flag is present in the bitstream and is equal to 1 or the need for presence of buffering periods for NAL HRD operation to be present in the bitstream in buffering period SEI messages is determined by the application, by some means not specified in HEVC specifications. Otherwise, the value of NalHrdBpPresentFlag may be set equal to 0.

A vcl_hrd_parameters_present_flag equal to 1 specifies that VCL HRD parameters (pertaining to all bitstream conformance) are present. A vcl_hrd_parameters_present_flag equal to 0 specifies that VCL HRD parameters are not present. It should be noted that when the vcl_hrd_parameters_present_flag is equal to 0, the conformance of the bitstream cannot be verified without provision of the VCL HRD parameters and all buffering period and picture timing SEI messages, by some means not specified in HEVC specifications. When the vcl_hrd_parameters_present_flag is equal to 1, VCL HRD parameters (from subclauses E.1.2 and E.2.2 of HEVC specifications, for example) immediately follow the flag.

The variable VclHrdBpPresentFlag may be derived as follows. If any of the following is true, the value of VclHrdBpPresentFlag may be set equal to 1: the vcl_hrd_parameters_present_flag is present in the bitstream and is equal to 1 or the need for presence of buffering periods for VCL HRD operation to be present in the bitstream in buffering period SEI messages is determined by the application, by some means not specified in HEVC specifications. Otherwise, the value of VclHrdBpPresentFlag may be set equal to 0.

Examples regarding the operation of a CPB in accordance with the systems and methods disclosed herein are given as follows. The specifications given as follows may apply independently to each set of CPB parameters that is present and to both Type I and Type II conformance in accordance with HEVC specifications.

The timing of bitstream arrival (e.g., one or more bitstream arrival times) may be determined as follows. The HRD may be initialized at any one of the buffering period SEI messages. Prior to initialization, the CPB may be empty. It should be noted that after initialization, the HRD may not be initialized again by subsequent buffering period SEI messages.

The access unit that is associated with the buffering period SEI message that initializes the CPB may be referred to as access unit 0. All other access units may be referred to as access unit n, with n being incremented by 1 for the next access unit in decoding order.

If the first access unit is a CRA access unit, leading pictures are not present and the cra_leadingpict_discard_flag is equal to 1, use_initial_cpb_removal_delay[SchedSelIdx] may be set to the value of initial_cra_cpb_removal_delay[SchedSelIdx]. Otherwise, the value of use_initial_cpb_removal_delay[SchedSelIdx] may be set to the value of initial_cpb_removal_delay[SchedSelIdx].

The time at which the first bit of access unit n begins to enter the CPB may be referred to as the initial arrival time $t_{ai}(n)$. The initial arrival time of access units may be derived as follows. If the access unit is access unit 0, $t_{ai}(0)=0$. Otherwise (e.g., the access unit is access unit n with n>0), the following may apply. If cbr_flag[SchedSelIdx] is equal to 1, the initial arrival time for access unit n is equal to the final arrival time (which may be derived as given below) of access unit n−1 (e.g., $t_{ai}(n)=t_{af}(n-1)$).

Otherwise, if cbr_flag[SchedSelIdx] is equal to 0 and access unit n is not the first access unit of a subsequent buffering period, the initial arrival time for access unit n may be derived by $t_{ai}(n)=\text{Max}(t_{af}(n-1), t_{ai,earliest}(n))$. In some configurations, $t_{ai,earliest}(n)$ may be given as follows: $t_{ai,earliest}(n)=t_{r,n}(n)-(\text{use\_initial\_cpb\_removal\_delay}$

[SchedSelIdx]+use_initial_cpb_removal_delay_offset [SchedSelIdx])÷90000 with $t_{r,n}(n)$ being the nominal removal time of access unit n from the CPB (as specified in subclause C.2.2 of JCTVC-H1003, for example) and use_initial_cpb_removal_delay[SchedSelIdx] and use_initial_cpb_removal_delay_offset[SchedSelIdx] being specified as described above based on the previous buffering period SEI message.

Otherwise (e.g., cbr_flag[SchedSelIdx] is equal to 0 and the subsequent access unit n is the first access unit of a subsequent buffering period), the initial arrival time for the access unit n may be derived by $t_{ai}(n)=t_{r,n}(n)-(\text{use\_initial\_cpb\_removal\_delay[SchedSelIdx]}\div 90000)$. In this case, use_initial_cpb_removal_delay[SchedSelIdx] may be specified as described above based on the buffering period SEI message associated with access unit n.

The final arrival time for access unit n may be derived by $t_{af}(n)=t_{ai}(n)+b(n)\div\text{BitRate[SchedSelIdx]}$. In this case, b(n) may be the size in bits of access unit n, counting the bits of the Type I bitstream for Type I conformance or the bits of the Type II bitstream for Type II conformance.

The values of SchedSelIdx, BitRate[SchedSelIdx], and CpbSize[SchedSelIdx] may be constrained as follows. If access unit n and access unit n−1 are part of different coded video sequences and the content of the active sequence parameter sets of the two coded video sequences differ, the HSS may select a value SchedSelIdx) of SchedSelIdx from among the values of SchedSelIdx provided for the coded video sequence containing access unit n that results in a BitRate[SchedSelIdx1] or CpbSize[SchedSelIdx1] for the second of the two coded video sequences (which contains access unit n−1) that differs from the value of BitRate[SchedSelIdx0] or CpbSize[SchedSelIdx0] for the value SchedSelIdx0 of SchedSelIdx that was in use for the coded video sequence containing access unit n−1. Otherwise, the HSS may continue to operate with the previous values of SchedSelIdx, BitRate[SchedSelIdx] and CpbSize[SchedSelIdx].

When the HSS selects values of BitRate[SchedSelIdx] or CpbSize[SchedSelIdx] that differ from those of the previous access unit, the following may apply. The variable BitRate[SchedSelIdx] may come into effect at time $t_{ai}(n)$. The variable CpbSize[SchedSelIdx] may come into effect as follows. If the new value of CpbSize[SchedSelIdx] exceeds the old CPB size, it may come into effect at time $t_{ai}(n)$. Otherwise, the new value of CpbSize[SchedSelIdx] may come into effect at the time $t_r(n)$.

In some configurations, the timing of coded picture removal may be implemented as follows. It may be assumed that the nominal CPB removal time and the CPB removal time of a coded picture are determined (e.g., calculated) immediately after the previous coded picture is removed from the CPB, or, for access unit 0, when the HRD is initialized.

If the first access unit is a CRA access unit, leading pictures are not present and the cra_leadingpict_discard_flag is equal to 1, then, for access unit 0, the nominal removal time of the access unit from the CPB may be specified by $t_{r,n}(0)=\text{initial\_cra\_cpb\_removal\_delay[SchedSelIdx]}\div 90000$. Otherwise, for access unit 0, the nominal removal time of the access unit from the CPB may be specified by $t_{r,n}(0)=\text{initial\_cpb\_removal\_delay[SchedSelIdx]}\div 90000$.

For the first access unit of a buffering period that does not initialize the HRD, the nominal removal time of the access unit from the CPB may be specified by $t_{r,n}(n)=t_{r,n}(n_b)+t_c*\text{cpb\_removal\_delay}(n)$. In this case, $t_{r,n}(n_b)$ is the nominal removal time of the first picture of the previous buffering period and cpb_removal_delay(n) is specified in the picture timing SEI message associated with access unit n.

When an access unit n is the first access unit of a buffering period, $n_b$ may be set equal to n at the removal time $t_{r,n}(n)$ of access unit n. The nominal removal time $t_{r,n}(n)$ of an access unit n that is not the first access unit of a buffering period may be given by $t_{r,n}(n)=t_{r,n}(n_b)+t_c*\text{cpb\_removal\_delay}(n)$.

The removal time of access unit n may be specified as follows. If low_delay_hrd_flag is equal to 0 or $t_{r,n}(n)\geq t_{af}(n)$, the removal time of access unit n may be specified by $t_r(n)=t_{r,n}(n)$. Otherwise (e.g., low_delay_hrd_flag is equal to 1 and $t_{r,n}(n)<t_{af}(n)$), the removal time of access unit n may be specified by $t_r(n)=t_{r,n}(n)+t_c*\text{Ceil}((t_{af}(n)-t_{r,n}(n))\div t_c)$. It should be noted that the latter case indicates that the size access unit n, b(n), may be so large that it prevents removal at the nominal removal time.

In some configurations, it is a requirement of bitstream conformance that all of the following conditions shall be fulfilled for each of the tests. For each access unit n, with n>0, associated with a buffering period SEI message, with $\Delta t_{g,90}(n)$ specified by $\Delta t_{g,90}(n)=90000*(t_{r,n}(n)-t_{af}(n-1))$, the value of use_initial_cpb_removal_delay[SchedSelIdx] shall be constrained as follows. If cbr_flag[SchedSelIdx] is equal to 0, then use_initial_cpb_removal_delay[SchedSelIdx]≤ Ceil($\Delta t_{g,90}(n)$). Otherwise (cbr_flag[SchedSelIdx] is equal to 1), Floor($\Delta t_{g,90}(n)$)≤use_initial_cpb_removal_delay [SchedSelIdx]≤Ceil($\Delta t_{g,90}(n)$). It should be noted that the exact number of bits in the CPB at the removal time of each picture may depend on which buffering period SEI message is selected to initialize the HRD. Encoders may take this into account to ensure that all specified constraints are obeyed regardless of which buffering period SEI message is selected to initialize the HRD, as the HRD may be initialized at any one of the buffering period SEI messages.

As illustrated by the foregoing, the systems and methods disclosed herein provide syntax and semantics that modify a buffering period SEI message for bitstreams starting with CRA pictures when leading pictures are present. In some configurations, the systems and methods disclosed herein may be applied to HEVC specifications.

The systems and methods disclosed herein may also describe electronic devices for signaling multiple initial buffering parameters for random access. For example, the systems and methods disclosed herein describe starting playback at a random access point (RAP) picture. In some configurations, the systems and methods disclosed herein may describe hypothetical reference decoder (HRD) buffering for signaling multiple initial buffering parameters. For instance, the systems and methods disclosed herein describe modification to a buffering period supplemental enhancement information (SEI) message and to an HRD for signaling multiple initial buffering parameters. The systems and methods disclosed herein (e.g., the HRD modification) may provide a benefit of reducing initial buffering latency when starting playback at a RAP picture. Also, the systems and methods disclosed herein may provide a benefit that the HRD will not underflow or overflow when starting playback at a RAP picture.

Another example of modified syntax and semantics in accordance with the systems and methods disclosed herein is given in Table (2) as follows. Modifications in accordance with the systems and methods disclosed herein are denoted in bold.

TABLE (2)

```
buffering_period( payloadSize ) {
    seq_parameter_set_id
    if( !sub_pic_cpb_params_present_flag )
        rap_cpb_params_present_flag
    if( NalHrdBpPresentFlag ) {
        for( SchedSelIdx = 0; SchedSelIdx <= cpb_cnt_minus1;
        SchedSelIdx++ ) {
            initial_cpb_removal_delay[ SchedSelIdx ]
            initial_cpb_removal_delay_offset[ SchedSelIdx ]
            if(sub_pic_cpb_params_present_flag ||
            rap_cpb_params_present_flag) {
                initial_alt_cpb_removal_delay[ SchedSelIdx ]
                initial_alt_cpb_removal_delay_offset[ SchedSelIdx ]
            }
            if(rap_cpb_params_present_flag ) {
                initial_alt1_cpb_removal_delay[ SchedSelIdx ]
                initial_alt1_cpb_removal_delay_offset[ SchedSelIdx ]
            }
        }
    }
    if( VclHrdBpPresentFlag ) {
        for( SchedSelIdx = 0; SchedSelIdx <= cpb_cnt_minus1;
        SchedSelIdx++ ) {
            initial_cpb_removal_delay[ SchedSelIdx ]
            initial_cpb_removal_delay_offset[ SchedSelIdx ]
            if( sub_pic_cpb_params_present_flag ||
                rap_cpb_params_present_flag) {
                initial_alt_cpb_removal_delay[ SchedSelIdx ]
                initial_alt_cpb_removal_delay_offset[ SchedSelIdx ]
            }
            if(rap_cpb_params_present_flag) {
                initial_alt1_cpb_removal_delay[ SchedSelIdx ]
                initial_alt1_cpb_removal_delay_offset[ SchedSelIdx ]
            }
        }
    }
}
```

Examples regarding buffering period SEI message semantics in accordance with the systems and methods disclosed herein are given as follows. In particular, additional detail regarding the semantics of the modified syntax elements are given as follows. An initial_alt1_cpb_removal_delay [SchedSelIdx] specifies the initial coded picture buffer (CPB) removal delay for the SchedSelIdx-th CPB. initial_alt1_cpb_removal_delay[SchedSelIdx] has a length in bits given by initial_cpb_removal_delay_length_minus1+1, and is in units of a 90 kHz clock. The value of initial_alt1_cpb_removal_delay[SchedSelIdx] may not be equal to 0 and may be less than or equal to 90000*(CpbSize [SchedSelIdx]÷BitRate[SchedSelIdx]), the time-equivalent of the CPB size in 90 kHz clock units. SchedSelIdx may be an index variable.

The initial CPB removal delay parameter information may be used by the CPB in defining constraints on the timing of bitstream arrival. The initial CPB removal delay parameter information may also specify the timing of decoding unit removal and decoding the decoding unit. For example, the initial CPB removal delay may define the amount of initial buffering that occurs in the HRD before playback of media is started.

initial_cpb_removal_delay[SchedSelIdx] and initial_alt_cpb_removal_delay[SchedSelIdx] may have the same syntax element values as initial_alt1_cpb_removal_delay [SchedSelIdx]. For example, initial_alt1_cpb_removal_delay[SchedSelIdx], initial_cpb_removal_delay[SchedSelIdx] and initial_alt_cpb_removal_delay[SchedSelIdx] may all specify the initial CPB removal delay for the SchedSelIdx-th CPB.

initial_cpb_removal_delay[SchedSelIdx] and initial_alt_cpb_removal_delay[SchedSelIdx] may provide similar information. However, the information provided may vary according to the bitstream. For example initial_cpb_removal_delay[SchedSelIdx] may provide information that may be used when the entire bitstream is transmitted and/or played back starting at a RAP picture without discarding any subsequent NAL units. Additionally, initial_alt_cpb_removal_delay[SchedSelIdx] may provide information that may be used when the entire bitstream is transmitted and/or played back starting at a RAP picture, but with discarding subsequent NAL units that have leading pictures associated with that RAP picture.

initial_alt1_cpb_removal_delay[SchedSelIdx] may provide information that may be used when the entire bitstream is transmitted and/or played back starting at a RAP picture, but with discarding subsequent NAL units which are tagged for discard (TFD) (e.g., TFD NAL units) associated with that RAP picture, for example. In this example, the bitstream may have decodable leading pictures present in the bitstream.

initial_alt1_cpb_removal_delay_offset[SchedSelIdx], initial_cpb_removal_delay_offset[SchedSelIdx] and initial_alt_cpb_removal_delay_offset[SchedSelIdx] are used for the SchedSelIdx-th CPB to specify the initial delivery time of coded data units to the CPB. The syntax elements have a length in bits given by initial_cpb_removal_delay_length_minus1+1 and are in units of a 90 kHz clock. These syntax elements are not used by decoders and may be needed only for the delivery scheduler (e.g., a hypothetical stream scheduler (HSS) specified in Annex C of JCTVC-H1003).

rap_cpb_params_present_flag equal to 1 specifies the presence of the initial_alt_cpb_removal_delay[SchedSelIdx] and initial_alt_cpb_removal_delay_offset[SchedSelIdx] syntax elements. When not present, the value of rap_cpb_params_present_flag may be inferred to be equal to 0. When the associated picture is neither a CRA picture nor a (broken link access) BLA picture, the value of rap_cpb_params_present_flag may be equal to 0. In some configurations, rap_cpb_params_present_flag equal to 1 also indicates the presence of the initial_alt1_cpb_removal_delay [SchedSelIdx] and initial_alt1_cpb_removal_delay_offset [SchedSelIdx] syntax elements.

Over the entire coded video sequence, the sum of initial_cpb_removal_delay[SchedSelIdx] and initial_cpb_removal_delay_offset[SchedSelIdx] may be constant for each value of SchedSelIdx, and the sum of initial_alt_cpb_removal_delay[SchedSelIdx] and initial_alt_cpb_removal_delay_offset[SchedSelIdx] may be constant for each value of SchedSelIdx. Additionally, the sum of initial_alt1_cpb_removal_delay[SchedSelIdx] and initial_alt1_cpb_removal_delay_offset[SchedSelIdx] may be constant for each value of SchedSelIdx. Other parameter elements may be the same as corresponding syntax elements described in connection with Table (1). For example, seq_parameter_set_id, NalHrdBpPresentFlag and VclHrdBpPresentFlag may be the same as defined above.

When NalHrdBpPresentFlag or VclHrdBpPresentFlag is equal to 1, a buffering period SEI message can be associated with any access unit in the bitstream. Also, when NalHrdBpPresentFlag or VclHrdBpPresentFlag is equal to 1, a buffering period SEI message may be associated with each RAP access unit and with each access unit associated with a recovery point SEI message. It should be noted that for some applications, the frequent presence of a buffering period SEI message may be desirable.

When an SEI NAL unit that includes a buffering period SEI message and has nuh_reserved_zero_6 bits equal to 0 is present, the SEI NAL unit may precede, in decoding order, the first VCL NAL unit in the access unit. As used herein, a "buffering period" is specified as the set of access units between two instances of the buffering period SEI message in decoding order.

In some configurations, the HRD may be initialized at any one of the buffering period SEI messages. Prior to initialization, the CPB may be empty. In some instances, after initialization, the HRD may not be initialized again by subsequent buffering period SEI messages.

Each access unit may be referred to as access unit n, where the number n identifies the particular access unit. The access unit that is associated with the buffering period SEI message that initializes the CPB may be referred to as access unit 0. The value of n may be incremented by 1 for each subsequent access unit in decoding order.

Each decoding unit may be referred to as decoding unit m, where the number m identifies the particular decoding unit. The first decoding unit in decoding order in access unit 0 may be referred to as decoding unit 0. The value of m may be incremented by 1 for each subsequent decoding unit in decoding order.

The variables InitCpbRemovalDelay[SchedSelIdx] and InitCpbRemovalDelayOffset[SchedSelIdx] may be set as follows. If InitCpbRemovalDelay[SchedSelIdx] is set to the value of the corresponding initial_alt_cpb_removal_delay [SchedSelIdx] of the associated buffering period SEI message or if InitCpbRemovalDelayOffset[SchedSelIdx] is set to the value of the corresponding initial_alt_cpb_removal_delay_offset[SchedSelIdx] of the associated buffering period SEI message, then access unit 0 may be a BLA access unit for which the coded picture has nal_unit_type equal to BLA_N_LP, and the value of rap_cpb_params_present_flag of the associated buffering period SEI message may be equal to 1. In other words, if the access unit 0 is a BLA access unit for which the coded picture has nal_unit_type equal to BLA_N_LP, then the value of rap_cpb_params_present_flag of the associated buffering period SEI message may be equal to 1. For example, if SubPicCpbFlag equals to 1, then InitCpbRemovalDelay[SchedSelIdx] may be set to the value of the corresponding initial_alt_cpb_removal_delay[SchedSelIdx] of the associated buffering period SEI message. Also, if SubPicCpbFlag equals to 1, then InitCpbRemovalDelayOffset[SchedSelIdx] may be set to the value of the corresponding initial_alt_cpb_removal_delay_offset [SchedSelIdx] of the associated buffering period SEI message. In addition, SubPicCpbFlag may be equal to 1.

If InitCpbRemovalDelay[SchedSelIdx] is set to the value of corresponding initial_alt1_cpb_removal_delay[SchedSelIdx] of the associated buffering period SEI message and InitCpbRemovalDelayOffset[SchedSelIdx] is set to the value of the corresponding initial_alt1_cpb_removal_delay_offset[SchedSelIdx] of the associated buffering period SEI message, then access unit 0 may be a BLA access unit for which the coded picture has nal_unit_type equal to BLA_W_DLP, and the value of rap_cpb_params_present_flag of the associated buffering period SEI message may be equal to 1. In other words, if the access unit 0 is a BLA access unit for which the coded picture has nal_unit_type equal to BLA_W_DLP, then the value of rap_cpb_params_present_flag of the associated buffering period SEI message may be equal to 1. For example, if SubPicCpbFlag equals to 1, then InitCpbRemovalDelay[SchedSelIdx] may be set to the value of the corresponding initial_alt1_cpb_removal_delay[SchedSelIdx] of the associated buffering period SEI message. Also, if SubPicCpbFlag equals to 1, then InitCpbRemovalDelayOffset[SchedSelIdx] may be set to the value of the corresponding initial_alt1_cpb_removal_delay_offset [SchedSelIdx] of the associated buffering period SEI message.

Otherwise, InitCpbRemovalDelay[SchedSelIdx] and InitCpbRemovalDelayOffset[SchedSelIdx] may be set to the values of the corresponding initial_cpb_removal_delay [SchedSelIdx] and initial_cpb_removal_delay_offset [SchedSelIdx], respectively, of the associated buffering period SEI message.

For convenience, several definitions are given as follows, which may be applied to the systems and methods disclosed herein. A random access point may be any point in a stream of data (e.g., bitstream) where decoding of the bitstream does not require access to any point in a bitstream preceding the random access point to decode a current picture and all pictures subsequent to said current picture in output order. A RAP picture may include only I slices and may be a broken link access (BLA) picture, a clean random access (CRA) picture or an instantaneous decoding refresh (IDR) picture. The first picture in the bitstream must be a RAP picture.

A broken link access (BLA) picture is one type of RAP picture. A BLA picture may include only I slices, and may be the first picture in the bitstream in decoding order, or may appear later in the bitstream. Each BLA picture begins a new coded video sequence, and has the same effect on the decoding process as an IDR picture. However, a BLA picture may include syntax elements that, if it had been CRA picture instead, would specify a non-empty reference picture set. When a BLA picture is encountered in a bitstream, these syntax elements are ignored and the reference picture set is instead initialized as an empty set.

A clean random access (CRA) picture is one type of RAP picture. A CRA picture may include only I slices, and may be the first picture in the bitstream in decoding order, or may appear later in the bitstream. A CRA picture may have associated decodable leading pictures (DLP) and tagged for discard (TFD) pictures.

An instantaneous decoding refresh (IDR) picture is a type of RAP picture. An IDR picture may include only I slices, and may be the first picture in the bitstream in decoding order, or may appear later in the bitstream. Each IDR picture is the first picture of a coded video sequence in decoding order.

A decodable leading picture (DLP) is a leading picture. A DLP is not used as a reference picture for the decoding process of trailing pictures of the same associated RAP picture. Tagged for discard (TFD) pictures are leading pictures of an associated BLA or CRA picture. When the associated RAP picture is a BLA picture or is the first coded picture in the bitstream, the TFD picture is not output and may not be correctly decodable, as the TFD picture may include references to reference pictures that are not present in the bitstream.

A leading picture is a picture that precedes the associated RAP picture in output order. A trailing picture is a picture that follows the associated RAP picture in output order.

A buffering period may be specified as a set of access units between two instances of the buffering period SEI message in decoding order. Supplemental enhancement information (SEI) messages may include information that is not necessary to decode the samples of coded pictures from VCL NAL units. SEI messages may assist in procedures related to decoding, display or other purposes. However, SEI messages may not be required for constructing luma or chroma samples by a decoding process. Conforming decoders may not be required to process this information for output order conformance to HEVC specifications (Annex C of HEVC specifications includes specifications for conformance, for example). Some SEI message information may be required to check bitstream conformance and for output timing decoder conformance.

A buffering period SEI message may be an SEI message related to a buffering period. It may define syntax and semantics which define bitstream arrival timing and coded picture removal timing.

A picture parameter set (PPS) is a syntax structure containing syntax elements that apply to zero or more entire coded pictures as determined by the pic_parameter_set_id syntax element found in each slice header. pic_parameter_set_id may identify the picture parameter set that is referred to in the slice header. The value of pic_parameter_set_id may be in the range of 0 to 255, inclusive.

A coded picture buffer (CPB) may be a first-in first-out buffer containing access units in decoding order specified in a hypothetical reference decoder (HRD). An access unit may be a set of network access layer (NAL) units that are consecutive in decoding order and contain exactly one coded picture. In addition to the coded slice NAL units of the coded picture, the access unit may also contain other NAL units not containing slices of the coded picture. The decoding of an access unit always results in a decoded picture. A NAL unit may be a syntax structure containing an indication of the type of data to follow and bytes containing that data in the form of a raw byte sequence payload interspersed as necessary with emulation prevention bytes.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating an example of one or more electronic devices 102 in which systems and methods for sending a message and buffering a bitstream may be implemented. In this example, electronic device A 102a and electronic device B 102b are illustrated. However, it should be noted that one or more of the features and functionality described in relation to electronic device A 102a and electronic device B 102b may be combined into a single electronic device in some configurations.

Electronic device A 102a includes an encoder 104. The encoder 104 includes a message generation module 108. Each of the elements included within electronic device A 102a (e.g., the encoder 104 and the message generation module 108) may be implemented in hardware, software or a combination of both.

Electronic device A 102a may obtain one or more input pictures 106. In some configurations, the input picture(s) 106 may be captured on electronic device A 102a using an image sensor, may be retrieved from memory and/or may be received from another electronic device.

The encoder 104 may encode the input picture(s) 106 to produce encoded data. For example, the encoder 104 may encode a series of input pictures 106 (e.g., video). In one configuration, the encoder 104 may be an HEVC encoder. The encoded data may be digital data (e.g., part of a bitstream 114). The encoder 104 may generate overhead signaling based on the input signal.

The message generation module 108 may generate one or more messages. For example, the message generation module 108 may generate one or more SEI messages or other messages. In one configuration, the electronic device 102 (e.g., the encoder 104) may determine whether a first picture (e.g., an encoded picture) is a CRA picture and whether a leading picture is present if the first picture is a CRA picture. If the first picture is a CRA picture and a leading picture is present, then the message generation module 108 may generate a message (e.g., buffering period SEI message or other message) that includes one or more of a CRA leading picture discard flag (e.g., cra_leadingpict_discard_flag), an initial CRA CPB removal delay parameter (e.g., initial_cra_cpb_removal_delay[SchedSelIdx]) and an initial CRA CPB removal delay offset parameter (e.g., initial_cra_cpb_removal_delay_offset[SchedSelIdx]). For example, the message generation module 108 may perform one or more of the procedures described in connection with FIG. 2 and FIG. 3 below.

In another configuration, the electronic device 102 (e.g., the encoder 104) may determine whether a picture (e.g., an encoded picture) is a random access point (RAP) and whether the picture is associated with a broken link access (BLA) with decodable leading pictures (DLP) network access layer (NAL) unit type if the picture is a RAP picture. The BLA with DLP NAL unit type may indicate that no associated tagged for discard (TFD) pictures are present in the bitstream. If the BLA with DLP NAL unit type is present, then the message generation module 108 may generate a message (e.g., buffering period SEI message or other message) that includes one or more of a RAP CPB flag (e.g., rap_cpb_params_present_flag), an initial additional CPB removal delay parameter (e.g., initial_alt1_cpb_removal_delay[SchedSelIdx]) and an initial additional CPB removal delay offset parameter (e.g., initial_alt1_cpb_removal_delay_offset[SchedSelIdx]). For example, the message generation module 108 may perform one or more of the procedures described in connection with FIG. 12 and FIG. 13 below.

In some configurations, electronic device A 102a may send the message to electronic device B 102b as part of the bitstream 114. In some configurations electronic device A 102a may send the message to electronic device B 102b by a separate transmission 110. For example, the separate transmission may not be part of the bitstream 114. For instance, a buffering period SEI message or other message may be sent using some out-of-band mechanism. It should be noted that, in some configurations, the other message may include one or more of the features of a buffering period SEI message described above. Furthermore, the other message, in one or more aspects, may be utilized similarly to the SEI message described above.

The encoder 104 (and message generation module 108, for example) may produce a bitstream 114. The bitstream 114 may include encoded picture data based on the input picture(s) 106. In some configurations, the bitstream 114 may also include overhead data, such as a buffering period SEI message or other message, slice header(s), PPS(s), etc. As additional input pictures 106 are encoded, the bitstream 114 may include one or more encoded pictures. For instance, the bitstream 114 may include one or more encoded pictures with corresponding overhead data (e.g., a buffering period SEI message or other message).

The bitstream 114 may be provided to a decoder 112. In one example, the bitstream 114 may be transmitted to electronic device B 102b using a wired or wireless link. In some cases, this may be done over a network, such as the Internet or a Local Area Network (LAN). As illustrated in FIG. 1, the decoder 112 may be implemented on electronic device B 102b separately from the encoder 104 on electronic device A 102*a*. However, it should be noted that the encoder 104 and decoder 112 may be implemented on the same electronic device in some configurations. In an implementation where the encoder 104 and decoder 112 are implemented on the same electronic device, for instance, the bitstream 114 may be provided over a bus to the decoder 112 or stored in memory for retrieval by the decoder 112.

The decoder 112 may be implemented in hardware, software or a combination of both. In one configuration, the decoder 112 may be an HEVC decoder. The decoder 112 may receive (e.g., obtain) the bitstream 114. The decoder 112 may generate one or more decoded pictures 118 based on the bitstream 114. The decoded picture(s) 118 may be displayed, played back, stored in memory and/or transmitted to another device, etc.

The decoder 112 may include a CPB 120. The CPB 120 may temporarily store encoded pictures. For example, the CPB 120 may store encoded pictures until a removal time. In accordance with the systems and methods disclosed herein, one or more of an arrival time (of bitstream data, for example) and a removal time (of a coded picture, for example) may be determined by the decoder 112 based on a message (e.g., buffering period SEI message or other message).

In one configuration, the decoder 112 may receive a message (e.g., buffering period SEI message or other message). The decoder 112 may also determine whether a first access unit is a CRA access unit, whether leading pictures are not present and whether a CRA leading picture discard flag indicates discard. In some cases, if a first access unit is a CRA access unit and if leading pictures are not present, the access unit may be marked as BLA_N_LP access unit. If a first access unit is a CRA access unit, if leading pictures are not present and if a CRA leading picture discard flag indicates discard, or if the first access unit is either BLA_W_DLP or BLA_N_LP NAL unit and a CPB parameter flag is equal to 1, then the decoder 112 may set an initial removal delay variable to an initial CRA CPB removal delay parameter and may remove the first access unit (e.g., encoded picture) from the CPB based on the CRA CPB removal delay parameter. For instance, the CPB 120 may perform one or more of the procedures described in connection with FIG. 4 and FIG. 5 below.

In another configuration, the decoder 112 may receive a message (e.g., buffering period SEI message or other message). The decoder 112 may also determine whether a RAP CPB parameter flag indicates an initial additional CPB removal delay parameter. If the RAP CPB parameter flag indicates an initial additional CPB removal delay parameter the decoder 112 may perform an operation based on the initial additional CPB removal delay parameter. For instance, the CPB 120 may perform one or more of the procedures described in connection with FIG. 14, FIG. 15 and FIG. 16 below.

The HRD described above may be one example of the decoder 112 illustrated in FIG. 1. Thus, an electronic device 102 may operate in accordance with the HRD and CPB described above, in some configurations.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an Application-Specific Integrated Circuit (ASIC), a Large-Scale Integrated circuit (LSI) or integrated circuit, etc.

Figure 2:
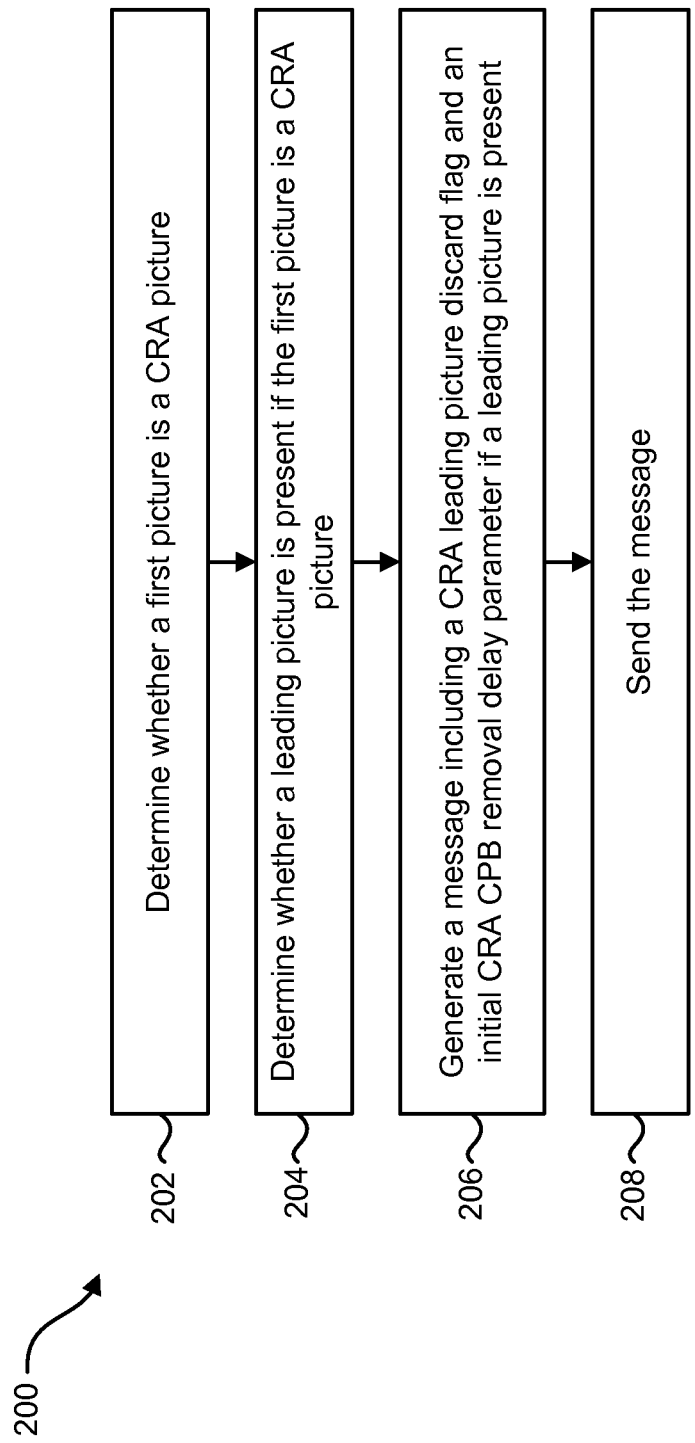
FIG. 2 is a flow diagram illustrating one configuration of a method for sending a message.

FIG. 2 is a flow diagram illustrating one configuration of a method 200 for sending a message. An electronic device 102 (e.g., electronic device A 102*a*) may determine 202 whether a first picture is a CRA picture. For example, the encoder 104 may encode an input picture 106 as a CRA picture. In some configurations, a CRA picture may be an encoded picture that may be decoded using intra prediction only. For example, a CRA picture may include one or more (e.g., only) I slices, where each slice has a nal_unit_type (e.g., network abstraction layer unit type) equal to 4. All coded pictures that follow the CRA picture both in decoding order and output order may not use inter prediction from any picture that precedes the CRA picture either in decoding order or output order. Furthermore, any picture that precedes the CRA picture in decoding order may also precede the CRA picture in output order. Accordingly, if the encoder 104 encodes an input picture 106 as a CRA picture (e.g., if a coded picture includes only I slices), the electronic device 102 may determine 202 that a first picture is a CRA picture. Otherwise, the electronic device 102 may determine 202 that a first picture is not a CRA picture.

It should be noted that a CRA picture may occur at a random access point in the bitstream 114. The random access point may be any point in a stream of data (e.g., bitstream) where decoding of the bitstream does not require access to any point in a bitstream preceding the random access point to decode a current picture and all pictures subsequent to said current picture in output order.

The electronic device 102 may determine 204 whether a leading picture is present if the first picture is a CRA picture. Additionally or alternatively, the electronic device 102 may determine if the first access unit is either BLA_W_DLP or BLA_N_LP NAL unit and a CPB parameter flag is equal to 1. A leading picture may be a picture that follows the CRA picture in decoding order and precedes the CRA picture in output order. For example, a leading picture may be present if a picture is specified by the encoder 104 to follow a CRA picture in decoding order and to precede the CRA picture in output order (e.g., order output from the decoder 112).

Determining 204 whether a leading picture is present may be accomplished in accordance with one or more approaches. In one approach, the electronic device 102 determines 204 that a leading picture is present if the first picture is a CRA picture and another picture is present that is specified (by the encoder 104, for example) to follow the CRA picture in decoding order and precede the CRA picture in output order. In some configurations, the electronic device 102 may read data corresponding to the CRA picture and one or more other pictures to determine whether a leading picture is present. For instance, the electronic device 102 may read data that specifies decoding order and output order of the CRA picture and one or more other pictures. For example, a picture order count (POC) may be utilized to determine output order. The decoding order may be determined based on the order in which syntax elements appear in the bitstream 114. In some configurations, output order may be defined as the order in which the decoded pictures are output from a decoded picture buffer in a case that the decoded pictures are to be output from the decoded picture buffer. The output order of a picture may be specified by the POC value, regardless of whether the picture is to be output. In some configurations, the decoding order may be defined as the order in which syntax elements are processed in a decoding process. If the conditions are met that a picture is designated to follow the CRA picture in decoding order and is designated to precede the CRA picture in output order, the electronic device 102 may determine 204 that a leading picture is present.

The electronic device 102 may generate 206 a message (e.g., buffering period SEI message or other message) including a CRA leading picture discard flag and an initial CRA CPB removal delay parameter if a leading picture is present. For example, the electronic device 102 may generate 206 a message that includes a cra_leadingpict_discard_flag and an initial_cra_cpb_removal_delay[SchedSelIdx]. In some configurations, the message may also include a CRA CPB removal delay offset parameter. For instance, the electronic device 102 may generate 206 a buffering period SEI message, as illustrated in Table (1) above.

The electronic device 102 may send 208 the message (e.g., buffering period SEI message or other message). For example, the electronic device 102 may transmit the message via one or more of wireless transmission, wired transmission, device bus, network, etc. For instance, electronic device A 102a may transmit the message to electronic device B 102b. The message may be part of the bitstream 114, for example. In some configurations, electronic device A 102a may send 208 the message to electronic device B 102b in a separate transmission 110 (that is not part of the bitstream 114). For instance, the message may be sent using some out-of-band mechanism.

Figure 3:
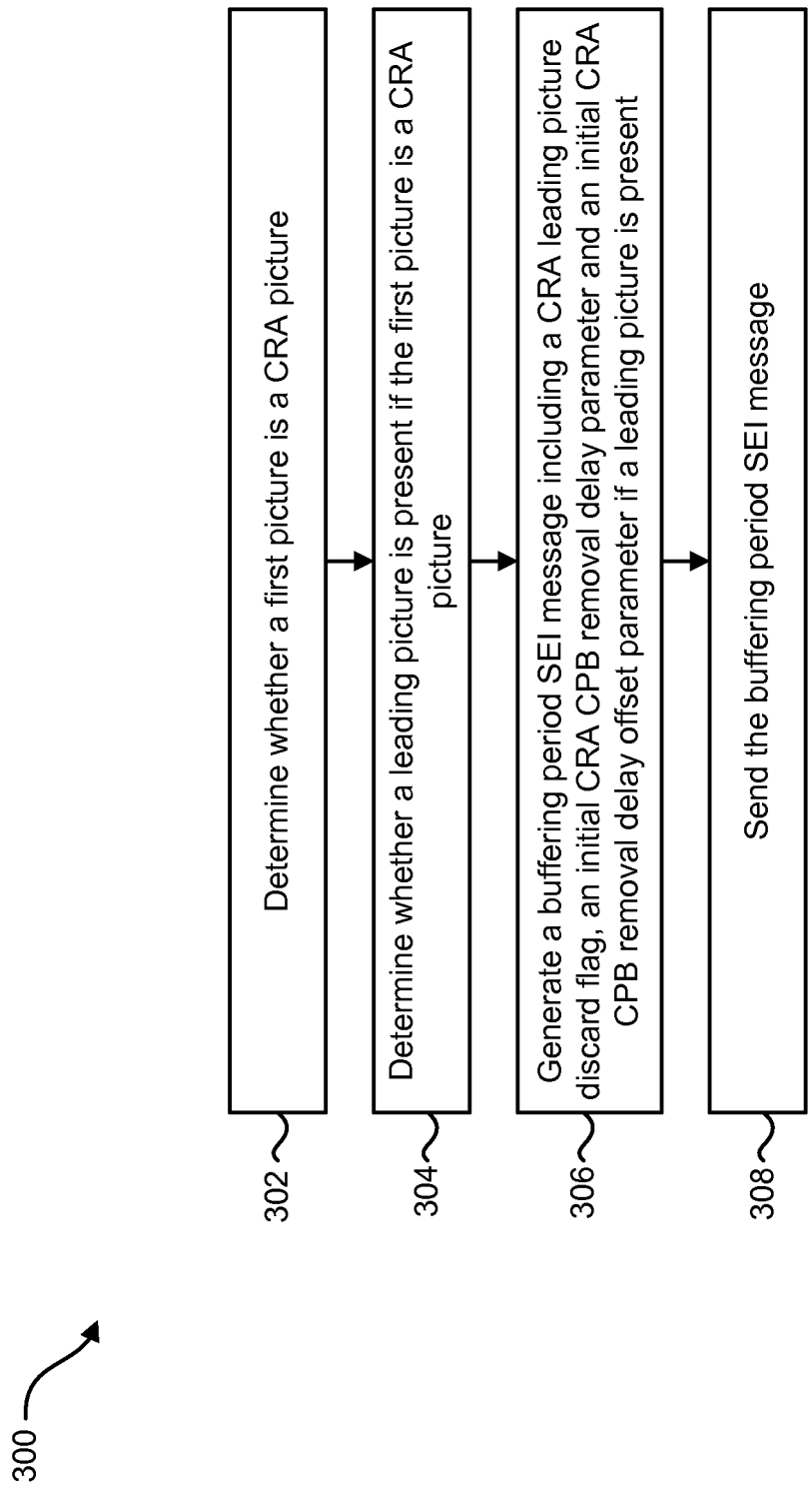
FIG. 3 is a flow diagram illustrating a more specific configuration of a method for sending a message.

FIG. 3 is a flow diagram illustrating a more specific configuration of a method 300 for sending a message. An electronic device 102 (e.g., electronic device A 102a) may determine 302 whether a first picture is a CRA picture. This may be accomplished as described in connection with FIG. 2 above.

The electronic device 102 may determine 304 whether a leading picture is present if the first picture is a CRA picture. Additionally or alternatively, the electronic device 102 may determine if the first access unit is either BLA_W_DLP or BLA_N_LP NAL unit and a CPB parameter flag is equal to 1. This may be accomplished as described in connection with FIG. 2 above.

The electronic device 102 may generate 306 a buffering period SEI message including a CRA leading picture discard flag, an initial CRA CPB removal delay parameter and an initial CRA CPB removal delay offset parameter if a leading picture is present. For example, the electronic device 102 may generate 306 a buffering period SEI message that includes a cra_leadingpict_discard_flag, an initial_cpb_removal_delay[SchedSelIdx] and an initial_cra_cpb_removal_delay_offset[SchedSelIdx]. For instance, the electronic device 102 may generate 306 a buffering period SEI message, as illustrated in Table (1) above.

The electronic device 102 may send 308 the buffering period SEI message. For example, the electronic device 102 may transmit the buffering period SEI message via one or more of wireless transmission, wired transmission, device bus, network, etc. For instance, electronic device A 102a may transmit the buffering period SEI message to electronic device B 102b. The buffering period SEI message may be part of the bitstream 114, for example.

Figure 4:
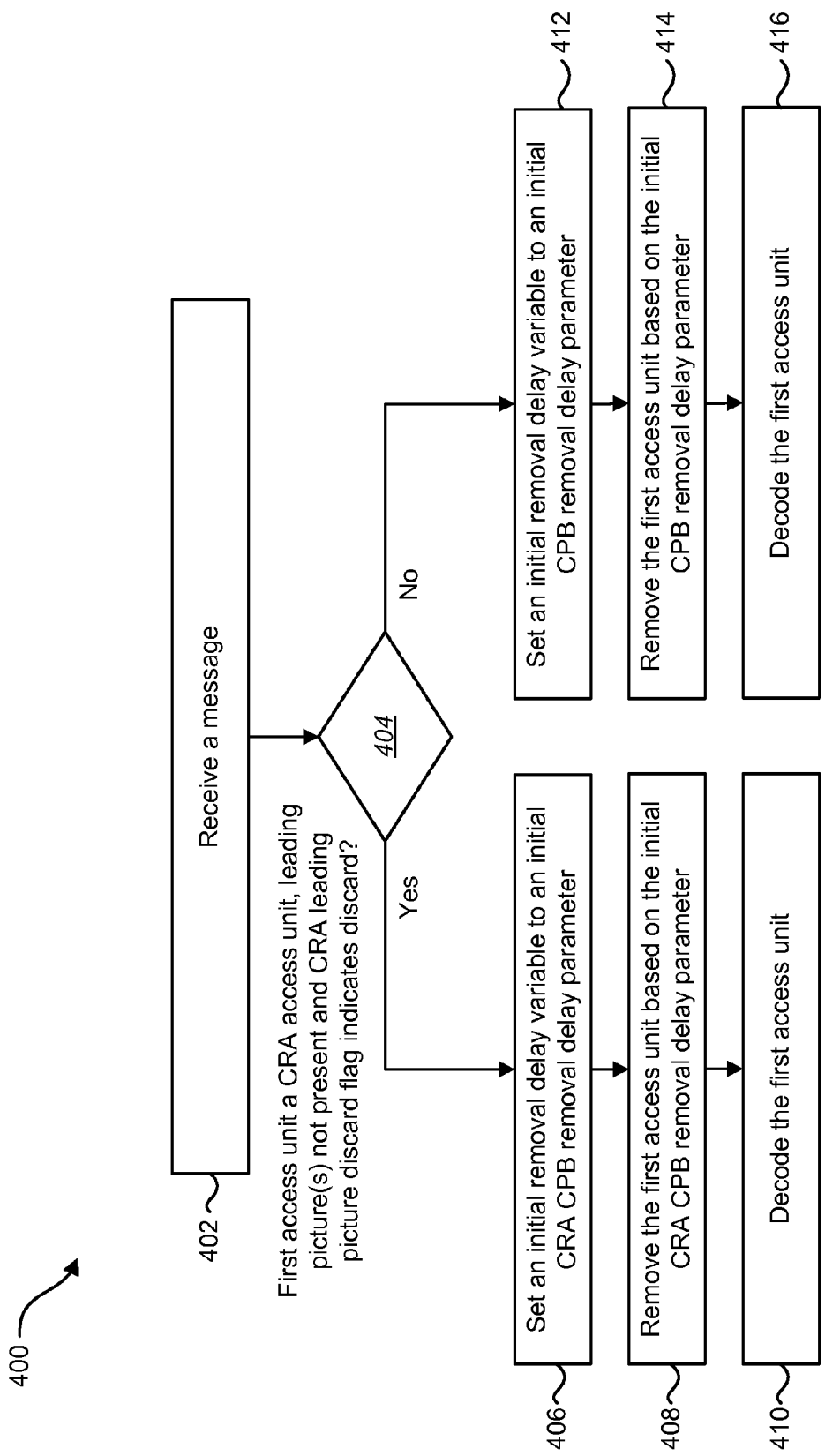
FIG. 4 is a flow diagram illustrating one configuration of a method for buffering a bitstream.

FIG. 4 is a flow diagram illustrating one configuration of a method 400 for buffering a bitstream. An electronic device 102 (e.g., electronic device B 102b) may receive 402 a message (e.g., a buffering period SEI message or other message). For example, the electronic device 102 may receive 402 the message via one or more of wireless transmission, wired transmission, device bus, network, etc.

For instance, electronic device B 102b may receive 402 the message from electronic device A 102a. The message may be part of the bitstream 114, for example. In another example, electronic device B 102b may receive the message from electronic device A 102a in a separate transmission 110 (that is not part of the bitstream 114, for example). For instance, the buffering period SEI message may be received using some out-of-band mechanism. In some configurations, the message may include one or more of a CRA discard flag, an initial CRA CPB removal delay parameter and an initial CRA CPB removal delay offset parameter. Thus, receiving 402 the message may include receiving one or more of a CRA discard flag, an initial CRA CPB removal delay parameter and an initial CRA CPB removal delay offset parameter.

The electronic device 102 may determine 404 whether a first access unit is a CRA access unit, whether one or more leading pictures are not present and whether a CRA leading picture flag indicates discard. Additionally or alternatively, the electronic device 102 may determine if the first access unit is either BLA_W_DLP or BLA_N_LP NAL unit and a CPB parameter flag is equal to 1. An access unit may be a set of one or more NAL units that contain an encoded picture. The bitstream 114 may include one or more access units. In some configurations, the electronic device 102 may determine 404 whether a first access unit is a CRA access unit based on a NAL unit type parameter (e.g., nal_unit_type) corresponding to the first access unit. For example, a nal_unit_type 4 may indicate a coded slice of a CRA picture. In this case, the electronic device may determine that an access unit is a CRA access unit if one or more (e.g., all) of the NAL unit types (e.g., nal_unit_types) corresponding to the first access unit indicate a coded slice of a CRA picture (e.g., are equal to 4). Otherwise, the electronic device 102 may determine that the first access unit is not a CRA access unit.

The electronic device 102 may determine whether any leading pictures are present. For example, the electronic device 102 may determine whether any leading picture(s) are included in a portion of the bitstream 114. As described above, a leading picture may be a picture that follows the CRA picture in decoding order and precedes the CRA picture in output order. For example, a leading picture may be present if a picture is specified by the encoder 104 to follow a CRA picture in decoding order and to precede the CRA picture in output order (e.g., order output from the decoder 112).

Determining whether a leading picture is present may be accomplished in accordance with one or more approaches. In one approach, the electronic device 102 determines that a leading picture is present if a picture (in the first access unit) is a CRA picture and another picture is present that is specified (by the encoder 104, for example) to follow the CRA picture in decoding order and precede the CRA picture in output order. In some configurations, the electronic device 102 may read data corresponding to the CRA picture and one or more other pictures to determine whether a leading picture is present. For example, the electronic device 102 may read data that specifies decoding order and output order of the CRA picture and one or more other pictures. In one example, the electronic device 102 may receive an indicator in the bitstream 114. In another example, the electronic device 102 may determine whether a leading picture is present by determining a POC value for the picture and comparing it to the POC value of a corresponding CRA picture. If the conditions are met that a picture is designated to follow the CRA picture in decoding order and is designated to precede the CRA picture in output order, the electronic device 102 may determine that a leading picture is present. If one or more of the criteria are not met, however, then the electronic device 102 may determine that no leading picture(s) are present.

The electronic device 102 may determine whether a CRA leading picture discard flag indicates discard. For example, the electronic device 102 may read the message to determine whether a CRA leading picture discard flag in the SEI message indicates discard. For instance, if the cra_leading-pict_discard_flag has a value of 1, then the electronic device 102 may determine that the CRA leading picture discard flag indicates discard. However, if the cra_leadingpict_discard_flag has a value of 0, then the electronic device 102 may determine that the CRA leading picture discard flag does not indicate discard. Additionally or alternatively, the electronic device 102 may determine if the first access unit is either BLA_W_DLP or BLA_N_LP NAL unit and a CPB parameter flag is equal to 1, for example.

If the first access unit is a CRA access unit, if no leading pictures are present and if the CRA picture discard flag indicates discard, then the electronic device 102 may set 406 an initial removal delay variable to an initial CRA CPB removal delay parameter. In this case, for example, the electronic device 102 may set use_initial_cpb_removal_delay[SchedSelIdx] to the value of initial_cra_cpb_removal_delay[SchedSelIdx].

In some configurations, the electronic device 102 (e.g., decoder 112) may determine a bitstream arrival time based one or more of the initial CRA CPB removal delay parameter and the initial CRA CPB removal delay offset parameter. For example, if the first access unit is a CRA access unit, if no leading pictures are present and if the CRA picture discard flag indicates discard, the bitstream arrival time may be determined as follows.

As described above, for an access unit after the access unit that initializes the CPB 120 (e.g., n>0), if cbr_flag [SchedSelIdx] is 0 and the access unit (e.g., n) is not the first access unit of a subsequent buffering period, the electronic device 102 may determine the bitstream arrival time $t_{ai}(n)$, which is based on $t_{ai,earliest}(n)$. $t_{ai,earliest}(n)$ may be determined based on the initial removal delay variable (e.g., use_initial_cpb_removal_delay[SchedSelIdx]) and an initial removal delay offset variable (e.g., use_initial_cpb_removal_delay_offset). As also described above, the initial removal delay variable may be set 406 to the initial CRA CPB removal delay parameter (e.g., initial_cra_cpb_removal_delay[SchedSelIdx]). Therefore, determining the bitstream arrival time may be based on the initial CRA CPB removal delay parameter. In some configurations, the initial removal delay offset variable (e.g., use_initial_cpb_removal_delay_offset[SchedSelIdx]) may also be set to the initial CRA CPB removal delay offset parameter (e.g., initial_cra_cpb_removal_delay_offset[SchedSelIdx]). Thus, determining the bitstream arrival time may be additionally based on the initial CRA CPB removal delay offset parameter.

As described above, for an access unit after the access unit that initializes the CPB 120 (e.g., n>0), if cbr_flag [SchedSelIdx] is 0 and the access unit (e.g., n) is the first access unit of a subsequent buffering period, the electronic device 102 may determine the bitstream arrival time $t_{ai}(n)$ based on the initial removal delay variable (e.g., use_initial_cpb_removal_delay[SchedSelIdx]). As also described above, the initial removal delay variable may be set 406 to the initial CRA CPB removal delay parameter (e.g., initial_cra_cpb_removal_delay[SchedSelIdx]). Therefore, determining the bitstream arrival time may be based on the initial CRA CPB removal delay parameter.

If the first access unit is a CRA access unit, if no leading pictures are present and if the CRA picture discard flag indicates discard, then the electronic device 102 may remove 408 the first access unit based on the initial CRA CPB removal delay parameter. For example, the electronic device 102 may determine a removal time for the first access unit based on the initial CRA CPB removal delay parameter (e.g., initial_cra_cpb_removal_delay[SchedSelIdx]). When the removal time arrives, the electronic device 102 may remove the first access unit from the CPB, for instance.

The electronic device 102 may decode 410 the first access unit. For example, the electronic device 102 may decode 410 an encoded picture included in the first access unit. In some configurations, the electronic device 102 may remove 408 the first access unit and decode 410 upon removal. For example, the data associated with each access unit may be removed and decoded instantaneously by an instantaneous decoding process at CPB removal time. It should be noted that the term "instantaneous" and variations thereof may not necessarily indicate the absence of any time period. For example, an "instantaneous" process may occupy some period of time.

If the first access unit is not a CRA access unit, if the first access unit is a CRA access unit and a leading picture is present or if the CRA picture discard flag does not indicate discard, then the electronic device 102 may set 412 an initial removal delay variable to an initial CPB removal delay parameter. In this case, for example, the electronic device 102 may set use_initial_cpb_removal_delay[SchedSelIdx] to the value of initial_cpb_removal_delay[SchedSelIdx].

If the first access unit is not a CRA access unit, if the first access unit is a CRA access unit and a leading picture is present or if the CRA picture discard flag does not indicate discard, then the electronic device 102 may remove 414 the first access unit based on the initial CPB removal delay parameter. For example, the electronic device 102 may determine a removal time for the first access unit based on the initial CPB removal delay parameter (e.g., initial_cpb_removal_delay[SchedSelIdx]). When the removal time arrives, the electronic device 102 may remove the first access unit from the CPB, for instance.

The electronic device 102 may decode 416 the first access unit. For example, the electronic device 102 may decode 416 an encoded picture included in the first access unit. For example, the data associated with each access unit may be removed and decoded instantaneously by an instantaneous decoding process at CPB removal time.

Figure 5:
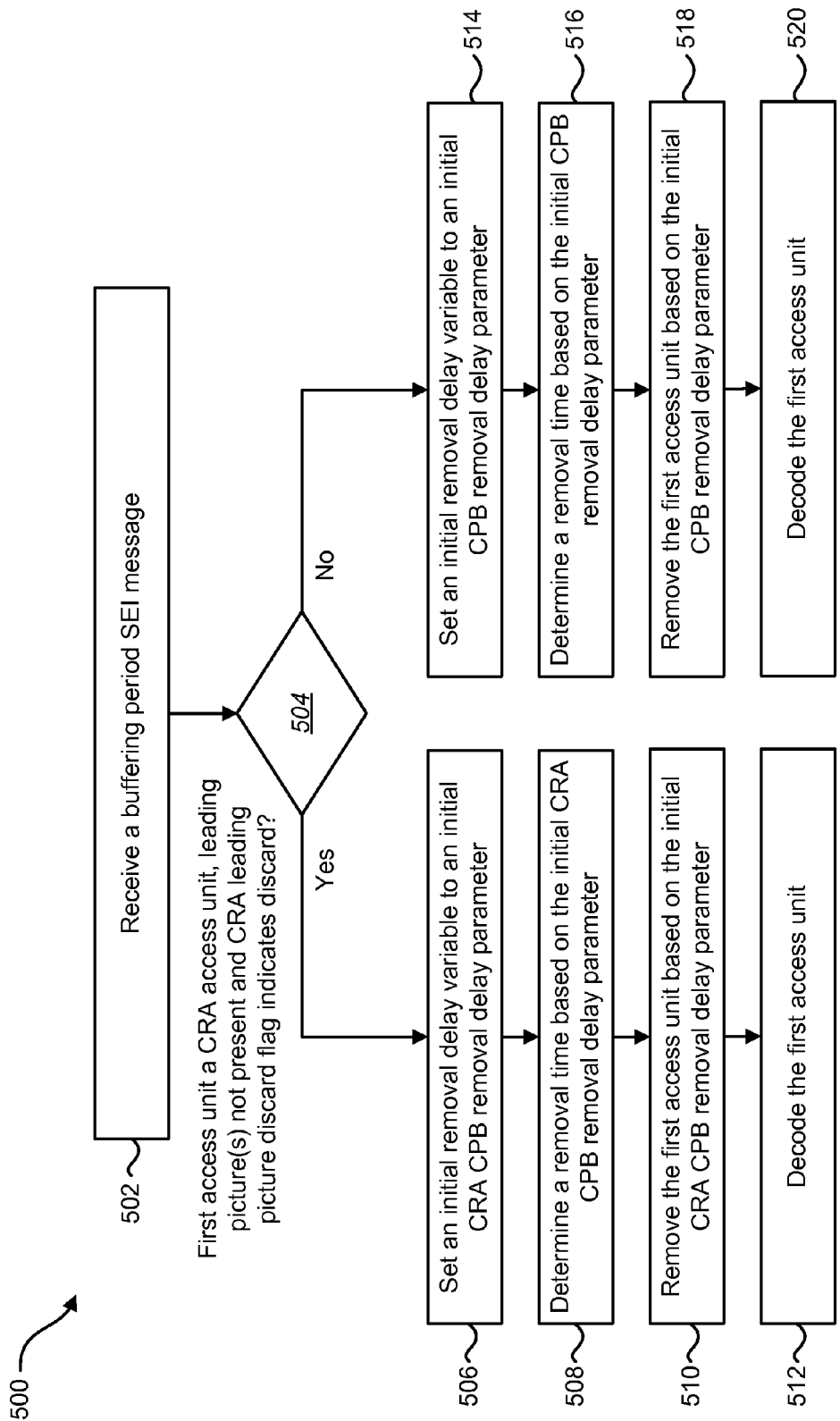
FIG. 5 is a flow diagram illustrating a more specific configuration of a method for buffering a bitstream.

FIG. 5 is a flow diagram illustrating a more specific configuration of a method 500 for buffering a bitstream. An electronic device 102 (e.g., electronic device B 102b) may receive 502 a buffering period SEI message. This may be accomplished as described above in connection with FIG. 4, for example.

The electronic device 102 may determine 504 whether a first access unit is a CRA access unit, whether one or more leading pictures are not present and whether a CRA leading picture flag indicates discard. Additionally or alternatively, the electronic device 102 may determine if the first access unit is either BLA_W_DLP or BLA_N_LP NAL unit and a CPB parameter flag is equal to 1. This may be accomplished as described above in connection with FIG. 4, for example.

If the first access unit is a CRA access unit, if no leading pictures are present and if the CRA picture discard flag indicates discard, then the electronic device 102 may set 506 an initial removal delay variable to an initial CRA CPB removal delay parameter. In this case, for example, the electronic device 102 may set use_initial_cpb_removal_delay[SchedSelIdx] to the value of initial_cra_cpb_removal_delay[SchedSelIdx].

In some configurations, the electronic device 102 may determine a bitstream arrival time based on one or more of the initial CRA CPB removal delay parameter and the initial CRA CPB removal delay offset parameter. This may be done as described in connection with FIG. 4 above, for example.

If the first access unit is a CRA access unit, if no leading pictures are present and if the CRA picture discard flag indicates discard, then the electronic device 102 may determine 508 a removal time (e.g., $t_{r,n}$) based on the initial CRA CPB removal delay parameter. This may be accomplished as described above in connection with initial_cra_cpb_removal_delay[SchedSelIdx]÷90000.

If the first access unit is a CRA access unit, if no leading pictures are present and if the CRA picture discard flag indicates discard, then the electronic device 102 may remove 510 the first access unit based on the initial CRA CPB removal delay parameter. For example, the electronic device 102 may determine 508 a removal time (e.g., $t_{r,n}$) for the first access unit based on the initial CRA CPB removal delay parameter (e.g., initial_cra_cpb_removal_delay[SchedSelIdx]) as described above. When the removal time (e.g., $t_{r,n}$) arrives, the electronic device 102 may remove 510 the first access unit from the CPB, for instance.

The electronic device 102 may decode 512 the first access unit. For example, the electronic device 102 may decode 512 an encoded picture included in the first access unit. For example, the data associated with each access unit may be removed and decoded instantaneously by an instantaneous decoding process at CPB removal time.

If the first access unit is not a CRA access unit, if the first access unit is a CRA access unit and a leading picture is present or if the CRA picture discard flag does not indicate discard, then the electronic device 102 may set 514 an initial removal delay variable to an initial CPB removal delay parameter. In this case, for example, the electronic device 102 may set use_initial_cpb_removal_delay[SchedSelIdx] to the value of initial_cpb_removal_delay[SchedSelIdx].

If the first access unit is not a CRA access unit, if the first access unit is a CRA access unit and a leading picture is present or if the CRA picture discard flag does not indicate discard, then the electronic device 102 may determine 516 a removal time (e.g., $t_{r,n}$) based on the initial CPB removal delay parameter. This may be accomplished as described above in connection with initial_cpb_removal_delay[SchedSelIdx]÷90000.

If the first access unit is not a CRA access unit, if the first access unit is a CRA access unit and a leading picture is present or if the CRA picture discard flag does not indicate discard, then the electronic device 102 may remove 518 the first access unit based on the initial CPB removal delay parameter. For example, the electronic device 102 may determine 516 a removal time (e.g., $t_{r,n}$) for the first access unit based on the initial CPB removal delay parameter (e.g., initial_cpb_removal_delay[SchedSelIdx]) as described above. When the removal time (e.g., $t_{r,n}$) arrives, the electronic device 102 may remove 518 the first access unit from the CPB, for instance.

The electronic device 102 may decode 520 the first access unit. For example, the electronic device 102 may decode 520 an encoded picture included in the first access unit. For example, the data associated with each access unit may be removed and decoded instantaneously by an instantaneous decoding process at CPB removal time.

Figure 6:
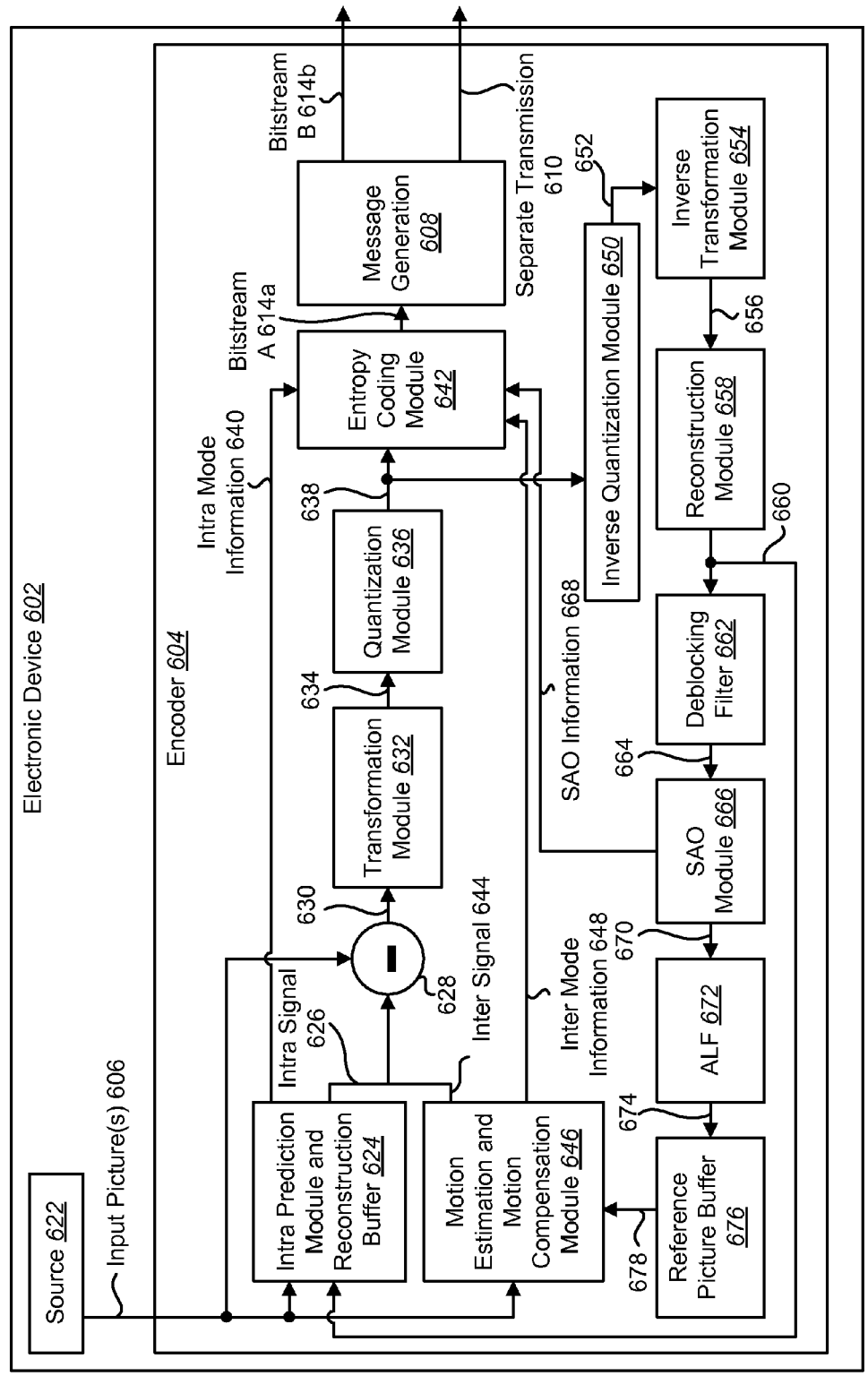
FIG. 6 is a block diagram illustrating one configuration of an encoder on an electronic device.

FIG. 6 is a block diagram illustrating one configuration of an encoder 604 on an electronic device 602. It should be noted that one or more of the elements illustrated as included within the electronic device 602 may be implemented in hardware, software or a combination of both. For example, the electronic device 602 includes an encoder 604, which may be implemented in hardware, software or a combination of both. For instance, the encoder 604 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 604 may be an HEVC coder.

The electronic device 602 may include a source 622. The source 622 may provide picture or image data (e.g., video) as one or more input pictures 606 to the encoder 604. Examples of the source 622 may include image sensors, memory, communication interfaces, network interfaces, wireless receivers, ports, etc.

One or more input pictures 606 may be provided to an intra-frame prediction module and reconstruction buffer 624. An input picture 606 may also be provided to a motion estimation and motion compensation module 646 and to a subtraction module 628.

The intra-frame prediction module and reconstruction buffer 624 may generate intra mode information 640 and an intra signal 626 based on one or more input pictures 606 and reconstructed data 660. The motion estimation and motion compensation module 646 may generate inter mode information 648 and an inter signal 644 based on one or more input pictures 606 and a reference picture buffer 676 signal 678. In some configurations, the reference picture buffer 676 may include data from one or more reference pictures in the reference picture buffer 676.

The encoder 604 may select between the intra signal 626 and the inter signal 644 in accordance with a mode. The intra signal 626 may be used in order to exploit spatial characteristics within a picture in an intra coding mode. The inter signal 644 may be used in order to exploit temporal characteristics between pictures in an inter coding mode. While in the intra coding mode, the intra signal 626 may be provided to the subtraction module 628 and the intra mode information 640 may be provided to an entropy coding module 642. While in the inter coding mode, the inter signal 644 may be provided to the subtraction module 628 and the inter mode information 648 may be provided to the entropy coding module 642.

Either the intra signal 626 or the inter signal 644 (depending on the mode) is subtracted from an input picture 606 at the subtraction module 628 in order to produce a prediction residual 630. The prediction residual 630 is provided to a transformation module 632. The transformation module 632 may compress the prediction residual 630 to produce a transformed signal 634 that is provided to a quantization module 636. The quantization module 636 quantizes the transformed signal 634 to produce transformed and quantized coefficients (TQCs) 638.

The TQCs 638 are provided to an entropy coding module 642 and an inverse quantization module 650. The inverse quantization module 650 performs inverse quantization on the TQCs 638 to produce an inverse quantized signal 652 that is provided to an inverse transformation module 654.

The inverse transformation module 654 decompresses the inverse quantized signal 652 to produce a decompressed signal 656 that is provided to a reconstruction module 658.

The reconstruction module 658 may produce reconstructed data 660 based on the decompressed signal 656. For example, the reconstruction module 658 may reconstruct (modified) pictures. The reconstructed data 660 may be provided to a deblocking filter 662 and to the intra prediction module and reconstruction buffer 624. The deblocking filter 662 may produce a filtered signal 664 based on the reconstructed data 660.

The filtered signal 664 may be provided to a sample adaptive offset (SAO) module 666. The SAO module 666 may produce SAO information 668 that is provided to the entropy coding module 642 and an SAO signal 670 that is provided to an adaptive loop filter (ALF) 672. The ALF 672 produces an ALF signal 674 that is provided to the reference picture buffer 676. The ALF signal 674 may include data from one or more pictures that may be used as reference pictures.

The entropy coding module 642 may code the TQCs 638 to produce bitstream A 614a (e.g., encoded picture data). For example, the entropy coding module 642 may code the TQCs 638 using Context-Adaptive Variable Length Coding (CAVLC) or Context-Adaptive Binary Arithmetic Coding (CABAC). In particular, the entropy coding module 642 may code the TQCs 638 based on one or more of intra mode information 640, inter mode information 648 and SAO information 668. Bitstream A 614a (e.g., encoded picture data) may be provided to a message generation module 608. The message generation module 608 may be configured similarly to the message generation module 108 described in connection with FIG. 1. Additionally or alternatively, the message generation module 608 may perform one or more of the procedures described in connection with FIG. 2 and FIG. 3.

For example, the message generation module 608 may generate a message (e.g., buffering period SEI message or other message) including one or more of a CRA leading picture discard flag, an initial CRA CPB removal delay parameter and an initial CRA CPB removal delay offset parameter if a first picture (in the bitstream 614a, for example) is a CRA picture and if a leading picture is present. As another example, the message generation module 608 may generate a message (e.g., buffering period SEI message or other message) including one or more of a random access point (RAP) CPB parameter flag, an initial additional CPB removal delay parameter and an initial additional CPB removal delay offset parameter if the picture is a RAP picture if a picture (in the bitstream 614a, for example) is a RAP picture and if a broken link access (BLA) with decodable leading pictures (DLP) network access layer (NAL) unit type is present.

In some configurations, the message may be inserted into bitstream A 614a to produce bitstream B 614b. Thus, the message may be generated after the entire bitstream A 614a is generated (e.g., after most of bitstream B 614b is generated), for example. In other configurations, the message may not be inserted into bitstream A 614a (in which case bitstream B 614b may be the same as bitstream A 614a), but may be provided in a separate transmission 610.

In some configurations, the electronic device 602 sends the bitstream 614 to another electronic device. For example, the bitstream 614 may be provided to a communication interface, network interface, wireless transmitter, port, etc. For instance, the bitstream 614 may be transmitted to another electronic device via LAN, the Internet, a cellular phone base station, etc. The bitstream 614 may additionally or alternatively be stored in memory or other component on the electronic device 602.

Figure 7:
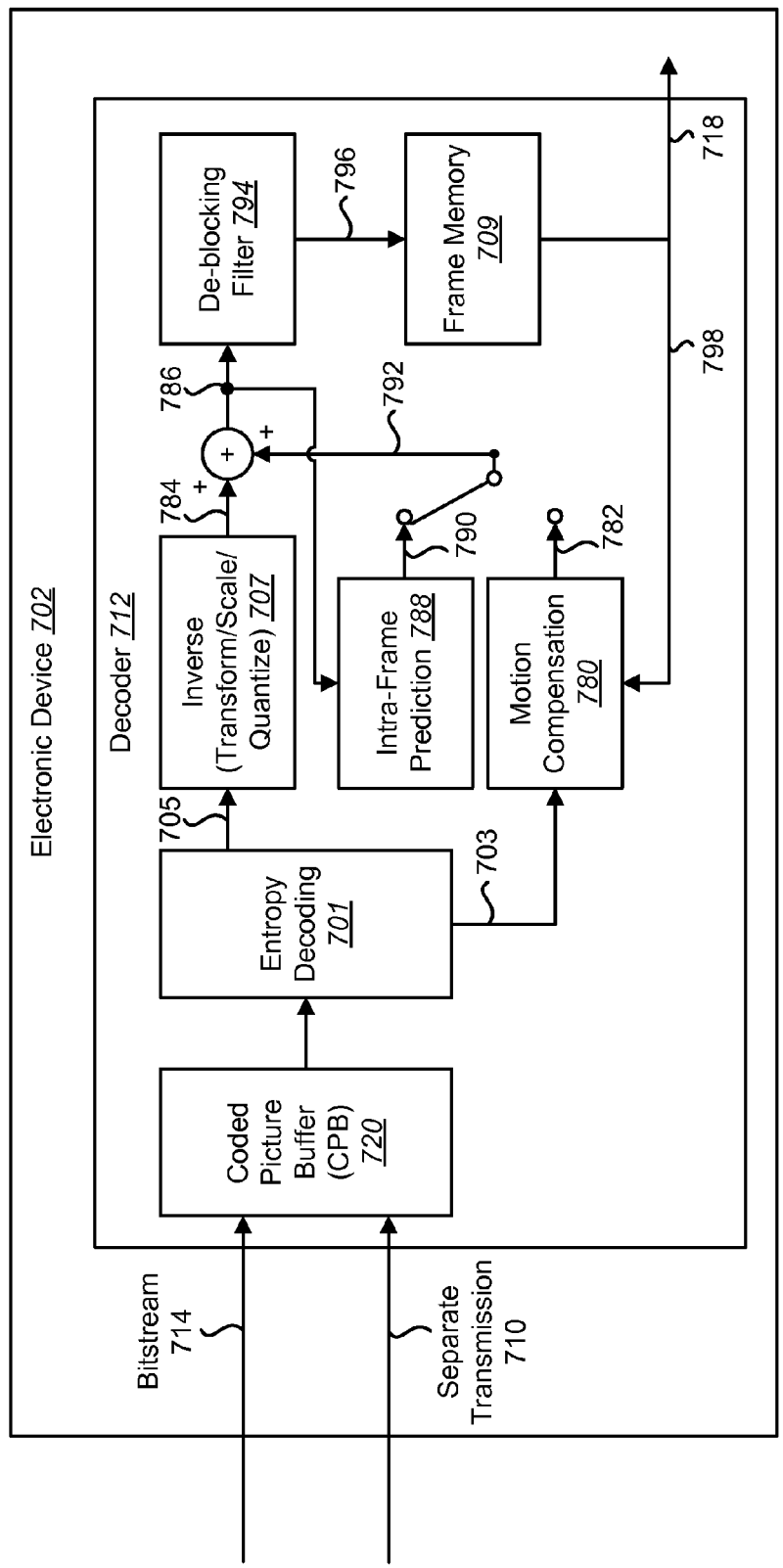
FIG. 7 is a block diagram illustrating one configuration of a decoder on an electronic device.

FIG. 7 is a block diagram illustrating one configuration of a decoder 712 on an electronic device 702. The decoder 712 may be included in an electronic device 702. For example, the decoder 712 may be an HEVC decoder. The decoder 712 and one or more of the elements illustrated as included in the decoder 712 may be implemented in hardware, software or a combination of both. The decoder 712 may receive a bitstream 714 (e.g., one or more encoded pictures and overhead data included in the bitstream 714) for decoding. In some configurations, the received bitstream 714 may include received overhead data, such as a message (e.g., buffer period SEI message or other message), slice header, PPS, etc. In some configurations, the decoder 712 may additionally receive a separate transmission 710. The separate transmission 710 may include a message (e.g., a buffer period SEI message or other message). For example, a buffer period SEI message or other message may be received in a separate transmission 710 instead of in the bitstream 714. However, it should be noted that the separate transmission 710 may be optional and may not be utilized in some configurations.

The decoder 712 includes a CPB 720. The CPB 720 may be configured similarly to the CPB 120 described in connection with FIG. 1 above. Additionally or alternatively, the decoder 712 may perform one or more of the procedures described in connection with FIG. 4 and FIG. 5. For example, the decoder 712 may receive a message (e.g., buffering period SEI message or other message). Additionally, the decoder 712 may perform one or more of setting an initial removal delay variable to an initial CRA CPB removal delay parameter and removing a first access unit based on the initial CRA CPB removal delay parameter if the first access unit is a CRA access unit, if a leading picture is not present and if a CRA leading picture discard flag indicates discard. It should be noted that one or more access units may be included in the bitstream and may include one or more of encoded picture data and overhead data.

Additionally or alternatively, the decoder 712 may perform one or more of the procedures described in connection with FIG. 14, FIG. 15 and FIG. 16, described below. For example, the decoder 712 may receive a message (e.g., buffering period SEI message or other message). Additionally, the decoder 712 may perform one or more of processing an initial additional CPB removal delay parameter, processing a broken link access (BLA) with decodable leading pictures (DLP) network access layer (NAL) unit type and performing an operation based on the initial additional CPB removal delay parameter.

The coded picture buffer (CPB) 720 may provide encoded picture data to an entropy decoding module 701. The encoded picture data may be entropy decoded by an entropy decoding module 701, thereby producing a motion information signal 703 and quantized, scaled and/or transformed coefficients 705.

The motion information signal 703 may be combined with a portion of a reference frame signal 798 from a frame memory 709 at a motion compensation module 780, which may produce an inter-frame prediction signal 782. The quantized, descaled and/or transformed coefficients 705 may be inverse quantized, scaled and inverse transformed by an inverse module 707, thereby producing a decoded residual signal 784. The decoded residual signal 784 may be added to a prediction signal 792 to produce a combined signal 786.

The prediction signal 792 may be a signal selected from either the inter-frame prediction signal 782 produced by the motion compensation module 780 or an intra-frame prediction signal 790 produced by an intra-frame prediction module 788. In some configurations, this signal selection may be based on (e.g., controlled by) the bitstream 714.

The intra-frame prediction signal 790 may be predicted from previously decoded information from the combined signal 786 (in the current frame, for example). The combined signal 786 may also be filtered by a de-blocking filter 794. The resulting filtered signal 796 may be written to frame memory 709. The resulting filtered signal 796 may include a decoded picture. The frame memory 709 may provide a decoded picture 718.

Figure 8:
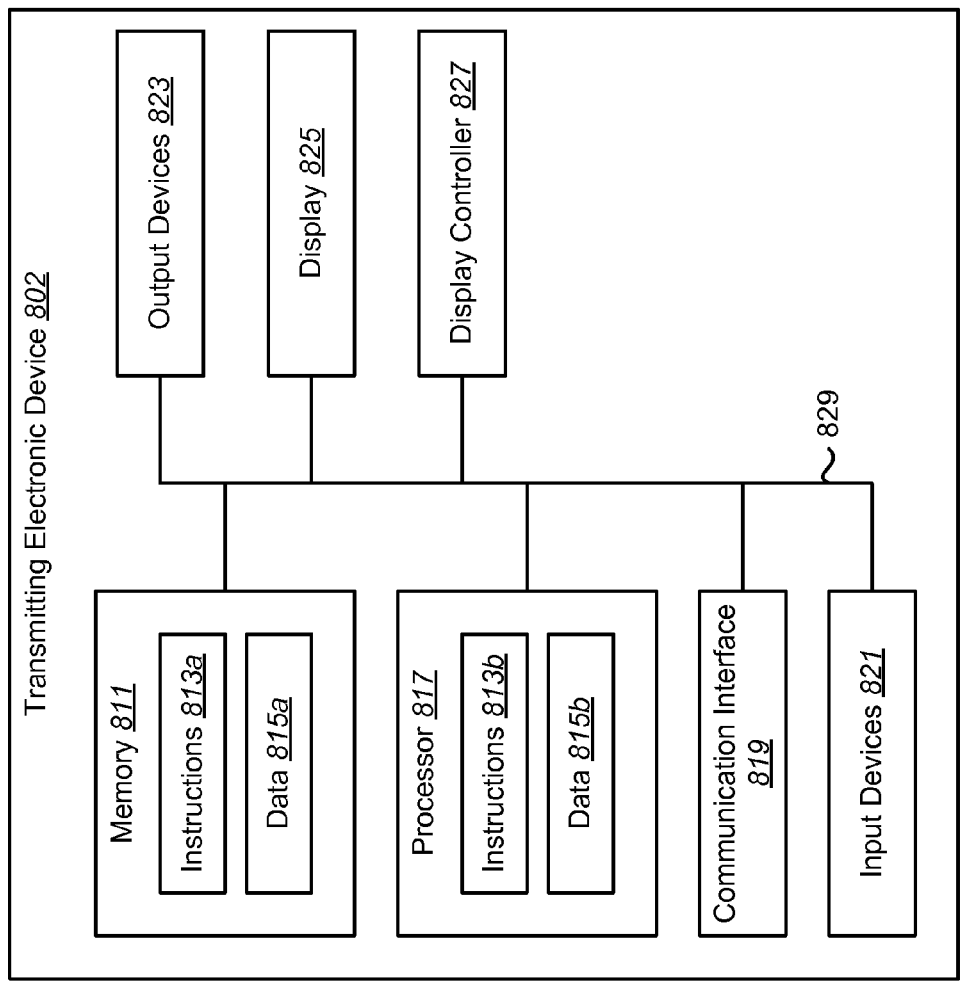
FIG. 8 illustrates various components that may be utilized in a transmitting electronic device.

FIG. 8 illustrates various components that may be utilized in a transmitting electronic device 802. One or more of the electronic devices 102, 602, 702 described herein may be implemented in accordance with the transmitting electronic device 802 illustrated in FIG. 8.

The transmitting electronic device 802 includes a processor 817 that controls operation of the electronic device 802. The processor 817 may also be referred to as a CPU. Memory 811, which may include both read-only memory (ROM), random access memory (RAM) or any type of device that may store information, provides instructions 813a (e.g., executable instructions) and data 815a to the processor 817. A portion of the memory 811 may also include non-volatile random access memory (NVRAM). The memory 811 may be in electronic communication with the processor 817.

Instructions 813b and data 815b may also reside in the processor 817. Instructions 813b and/or data 815b loaded into the processor 817 may also include instructions 813a and/or data 815a from memory 811 that were loaded for execution or processing by the processor 817. The instructions 813b may be executed by the processor 817 to implement the systems and methods disclosed herein. For example, the instructions 813b may be executable to perform one or more of the methods 200, 300, 400, 500 described above.

The transmitting electronic device 802 may include one or more communication interfaces 819 for communicating with other electronic devices (e.g., receiving electronic device). The communication interfaces 819 may be based on wired communication technology, wireless communication technology, or both. Examples of a communication interface 819 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The transmitting electronic device 802 may include one or more output devices 823 and one or more input devices 821. Examples of output devices 823 include a speaker, printer, etc. One type of output device that may be included in an electronic device 802 is a display device 825. Display devices 825 used with configurations disclosed herein may utilize any suitable image projection technology, such as a cathode ray tube (CRT), liquid crystal display (LCD), light-emitting diode (LED), gas plasma, electroluminescence or the like. A display controller 827 may be provided for converting data stored in the memory 811 into text, graphics, and/or moving images (as appropriate) shown on the display 825. Examples of input devices 821 include a keyboard, mouse, microphone, remote control device, button, joystick, trackball, touchpad, touchscreen, lightpen, etc.

The various components of the transmitting electronic device 802 are coupled together by a bus system 829, which may include a power bus, a control signal bus and a status signal bus, in addition to a data bus. However, for the sake of clarity, the various buses are illustrated in FIG. 8 as the bus system 829. The transmitting electronic device 802 illustrated in FIG. 8 is a functional block diagram rather than a listing of specific components.

Figure 9:
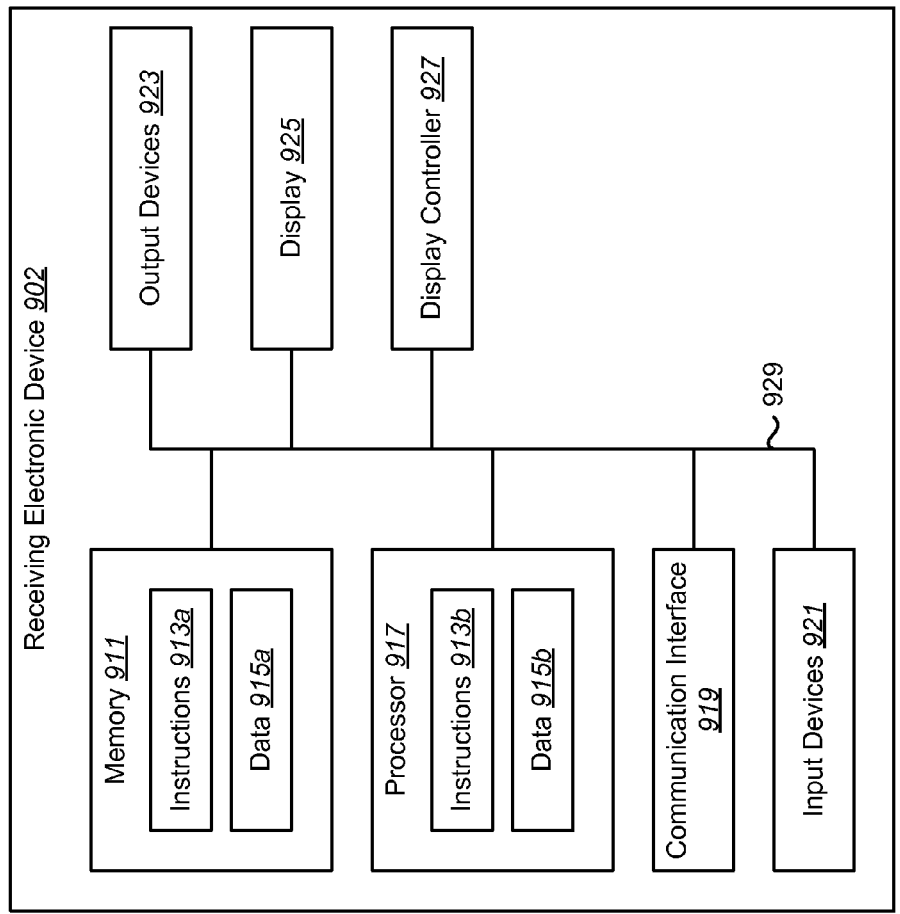
FIG. 9 is a block diagram illustrating various components that may be utilized in a receiving electronic device.

FIG. 9 is a block diagram illustrating various components that may be utilized in a receiving electronic device 902. One or more of the electronic devices 102, 602, 702 described herein may be implemented in accordance with the receiving electronic device 902 illustrated in FIG. 9.

The receiving electronic device 902 includes a processor 917 that controls operation of the electronic device 902. The processor 917 may also be referred to as a CPU. Memory 911, which may include both read-only memory (ROM), random access memory (RAM) or any type of device that may store information, provides instructions 913a (e.g., executable instructions) and data 915a to the processor 917. A portion of the memory 911 may also include non-volatile random access memory (NVRAM). The memory 911 may be in electronic communication with the processor 917.

Instructions 913b and data 915b may also reside in the processor 917. Instructions 913b and/or data 915b loaded into the processor 917 may also include instructions 913a and/or data 915a from memory 911 that were loaded for execution or processing by the processor 917. The instructions 913b may be executed by the processor 917 to implement the systems and methods disclosed herein. For example, the instructions 913b may be executable to perform one or more of the methods 200, 300, 400, 500 described above.

The receiving electronic device 902 may include one or more communication interfaces 919 for communicating with other electronic devices (e.g., a transmitting electronic device). The communication interface 919 may be based on wired communication technology, wireless communication technology, or both. Examples of a communication interface 919 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The receiving electronic device 902 may include one or more output devices 923 and one or more input devices 921. Examples of output devices 923 include a speaker, printer, etc. One type of output device that may be included in an electronic device 902 is a display device 925. Display devices 925 used with configurations disclosed herein may utilize any suitable image projection technology, such as a cathode ray tube (CRT), liquid crystal display (LCD), light-emitting diode (LED), gas plasma, electroluminescence or the like. A display controller 927 may be provided for converting data stored in the memory 911 into text, graphics, and/or moving images (as appropriate) shown on the display 925. Examples of input devices 921 include a keyboard, mouse, microphone, remote control device, button, joystick, trackball, touchpad, touchscreen, lightpen, etc.

The various components of the receiving electronic device 902 are coupled together by a bus system 929, which may include a power bus, a control signal bus and a status signal bus, in addition to a data bus. However, for the sake of clarity, the various buses are illustrated in FIG. 9 as the bus system 929. The receiving electronic device 902 illustrated in FIG. 9 is a functional block diagram rather than a listing of specific components.

Figure 10:
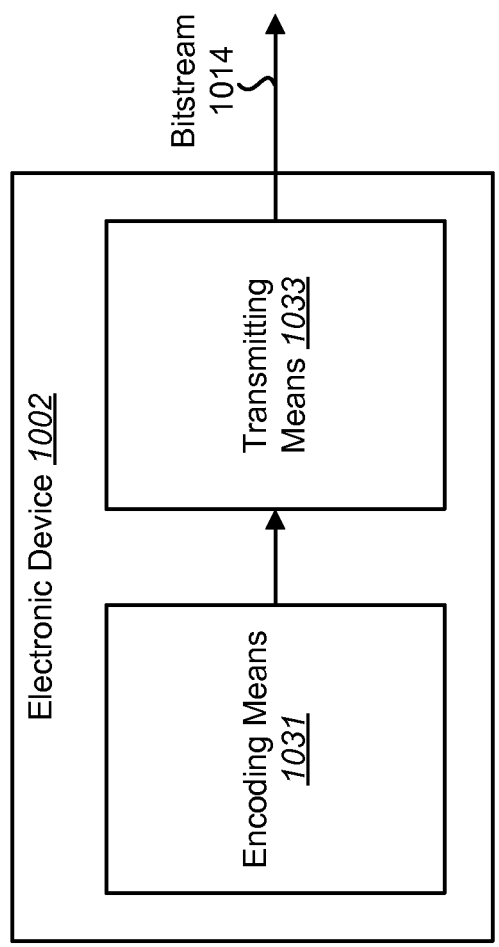
FIG. 10 is a block diagram illustrating one configuration of an electronic device in which systems and methods for sending a message may be implemented.

FIG. 10 is a block diagram illustrating one configuration of an electronic device 1002 in which systems and methods for sending a message may be implemented. The electronic device 1002 includes encoding means 1031 and transmitting means 1033. The encoding means 1031 and transmitting means 1033 may be configured to perform one or more of the functions described in connection with one or more of FIG. 1, FIG. 2, FIG. 3, FIG. 6 and FIG. 8 above, as well as FIG. 12 and FIG. 13 below. For example, the encoding means 1031 and transmitting means 1033 may generate a bitstream 1014. FIG. 8 above illustrates one example of a concrete apparatus structure of FIG. 10. Other various structures may be implemented to realize one or more of the functions of FIG. 1, FIG. 2, FIG. 3, FIG. 6 and FIG. 8 above, as well as FIG. 12 and FIG. 13 below. For example, a DSP may be realized by software.

Figure 11:
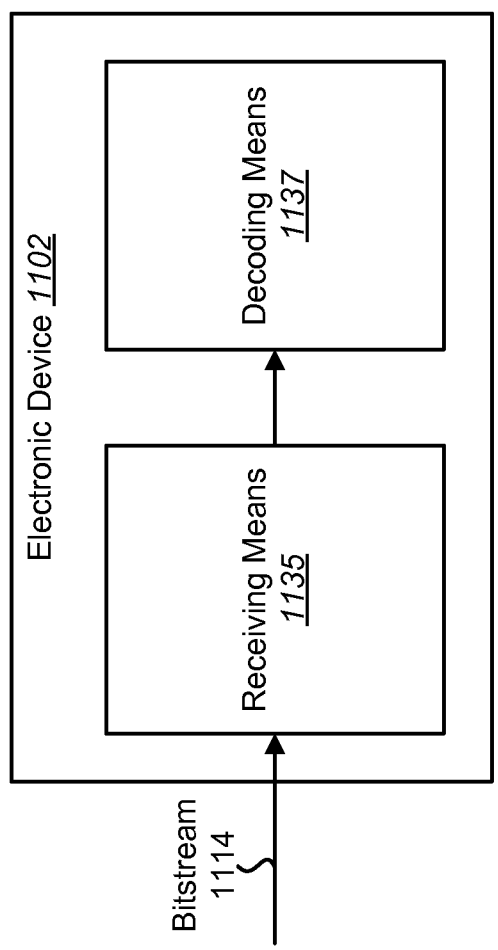
FIG. 11 is a block diagram illustrating one configuration of an electronic device in which systems and methods for buffering a bitstream may be implemented.

FIG. 11 is a block diagram illustrating one configuration of an electronic device 1102 in which systems and methods for buffering a bitstream 1114 may be implemented. The electronic device 1102 may include receiving means 1135 and decoding means 1137. The receiving means 1135 and decoding means 1137 may be configured to perform one or more of the functions described in connection with one or more of FIG. 1, FIG. 4, FIG. 5, FIG. 7 and FIG. 9 above, as well as FIG. 14, FIG. 15 and FIG. 16 below. For example, the receiving means 1135 and decoding means 1137 may receive a bitstream 1114. FIG. 9 above illustrates one example of a concrete apparatus structure of FIG. 11. Other various structures may be implemented to realize one or more functions of FIG. 1, FIG. 4, FIG. 5, FIG. 7 and FIG. 9 above, as well as FIG. 14, FIG. 15 and FIG. 16 below. For example, a DSP may be realized by software.

Figure 12:
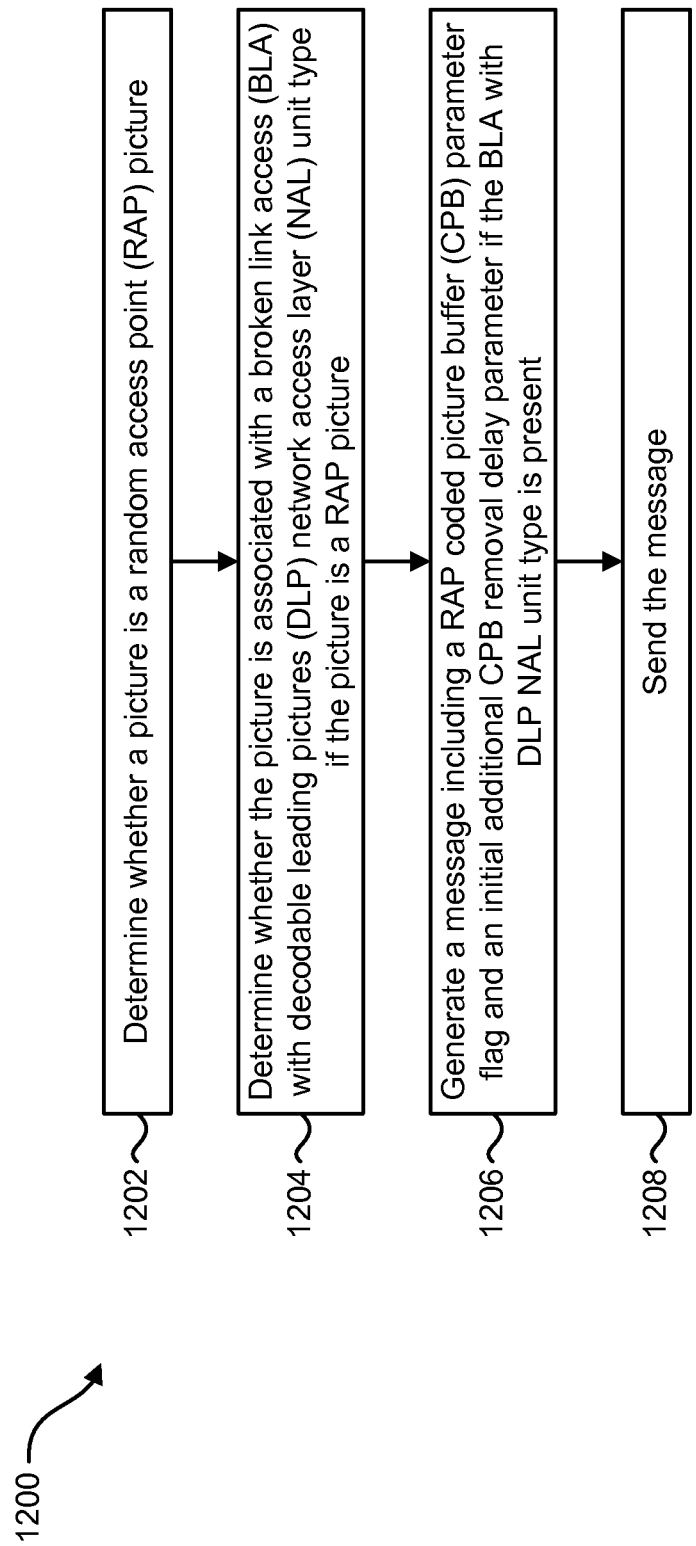
FIG. 12 is a flow diagram illustrating another configuration of a method for sending a message.

FIG. 12 is a flow diagram illustrating another configuration of a method 1200 for sending a message. An electronic device 102 (e.g., electronic device A 102a) may determine 1202 whether a picture is a random access point (RAP) picture. For example, the encoder 104 may encode an input picture 106 as a RAP picture. In some configurations, a RAP picture may be an encoded picture that may be decoded using intra prediction only. For example, a RAP picture may include one or more (e.g., only) I slices, where each slice has a nal_unit_type (e.g., network abstraction layer (NAL) unit type) equal to a value between 7 to 12. All coded pictures that follow the RAP picture both in decoding order and output order may not use inter prediction from any picture that precedes the RAP picture either in decoding order or output order. Furthermore, any picture that precedes the RAP picture in decoding order may also precede the RAP picture in output order. Accordingly, if the encoder 104 encodes an input picture 106 as a RAP picture (e.g., if a coded picture includes only I slices), the electronic device 102 may determine 1202 that the picture is a RAP picture. Otherwise, the electronic device 102 may determine 1202 that picture is not a RAP picture. The electronic device 102 may also determine whether the RAP picture is a BLA picture.

It should be noted that a RAP picture may be a broken link access (BLA) picture, a CRA picture or an instantaneous decoding refresh (IDR) picture. The RAP picture and all subsequent non-tagged for discard (non-TFD) pictures in decoding order may be correctly decoded without performing the decoding process of any pictures that precede the RAP picture in decoding order.

It should also be noted that a RAP picture may occur at a random access point in the bitstream 114. The random access point may be any point in a stream of data (e.g., bitstream) where decoding of the bitstream does not require access to any point in a bitstream preceding the random access point to decode a current picture and all pictures subsequent to said current picture in output order.

The electronic device 102 may determine 1204 whether the picture is associated with a broken link access (BLA) with decodable leading pictures (DLP) network access layer (NAL) unit type if the picture is a RAP picture. For example, electronic device 102 may generate a BLA with DLP NAL unit to be associated with the RAP picture.

The electronic device 102 may determine 1204 whether the picture is associated with a BLA based on the definition of BLA pictures. Additionally or alternatively, the electronic device 102 may determine 1204 whether the picture is associated with a BLA based on if there are any DLP pictures present subsequent to the BLA picture in decoding order and if all subsequent TFD pictures in decoding order after the BLA picture are discarded. For example, the electronic device 102 may determine that the picture as associated with a BLA_W_DLP picture.

A BLA_W_DLP picture may indicate to the electronic device 102 to drop all the TFD pictures subsequent to it. If there is a DLP picture present, it may be label the picture as a BLA picture (e.g., BLA_W_DLP). If the electronic device 102 obtains such a stream, it can decode the BLA and DLP pictures and all other subsequent pictures in decoding order.

The electronic device 102 may generate 1206 a message including a RAP coded picture buffer (CPB) parameter flag and initial additional CPB removal delay parameter if the BLA with DLP NAL unit type is present. For example, the electronic device 102 may generate 1206 a message that includes a rap_cpb_params_present_flag and an initial_alt1_cpb_removal_delay[SchedSelIdx]. In another example, a flag other than rap_cpb_params_present_flag may be included in the message when the additional initial CPB removal delay parameter is included in the message. It should be noted that since rap_cpb_params_present_flag already existed, it may be reused in this example. In addition, it should be noted that another flag signaling this additional parameter may be sent. For example, the RAP CPB parameter flag may be a new parameter flag. In other words, the RAP CPB parameter flag may be another flag other than rap_cpb_params_present_flag.

In some configurations, the RAP CPB parameter flag may be a Boolean flag. The RAP CPB parameter flag may be set to 1 when the picture (e.g., coded picture) has a nal_unit_type equal to BLA_W_DLP. In other words, the RAP CPB parameter flag may indicate a BLA with DLP NAL unit type is present when the picture is associated with a BLA with DLP NAL unit type.

In some configurations, the message may also include an initial additional CPB removal delay offset parameter. For instance, the electronic device 102 may generate 206 a buffering period SEI message, as illustrated in Table (2) above.

The electronic device 102 may send 1208 the message (e.g., buffering period SEI message or other message). For example, the electronic device 102 may transmit the message via one or more of wireless transmission, wired transmission, device bus, network, etc. For instance, electronic device A 102a may transmit the message to electronic device B 102b. The message may be part of the bitstream 114, for example. In some configurations, electronic device A 102a may send 1208 the message to electronic device B 102b in a separate transmission 110 (that is not part of the bitstream 114). For instance, the message may be sent using some out-of-band mechanism.

Figure 13:
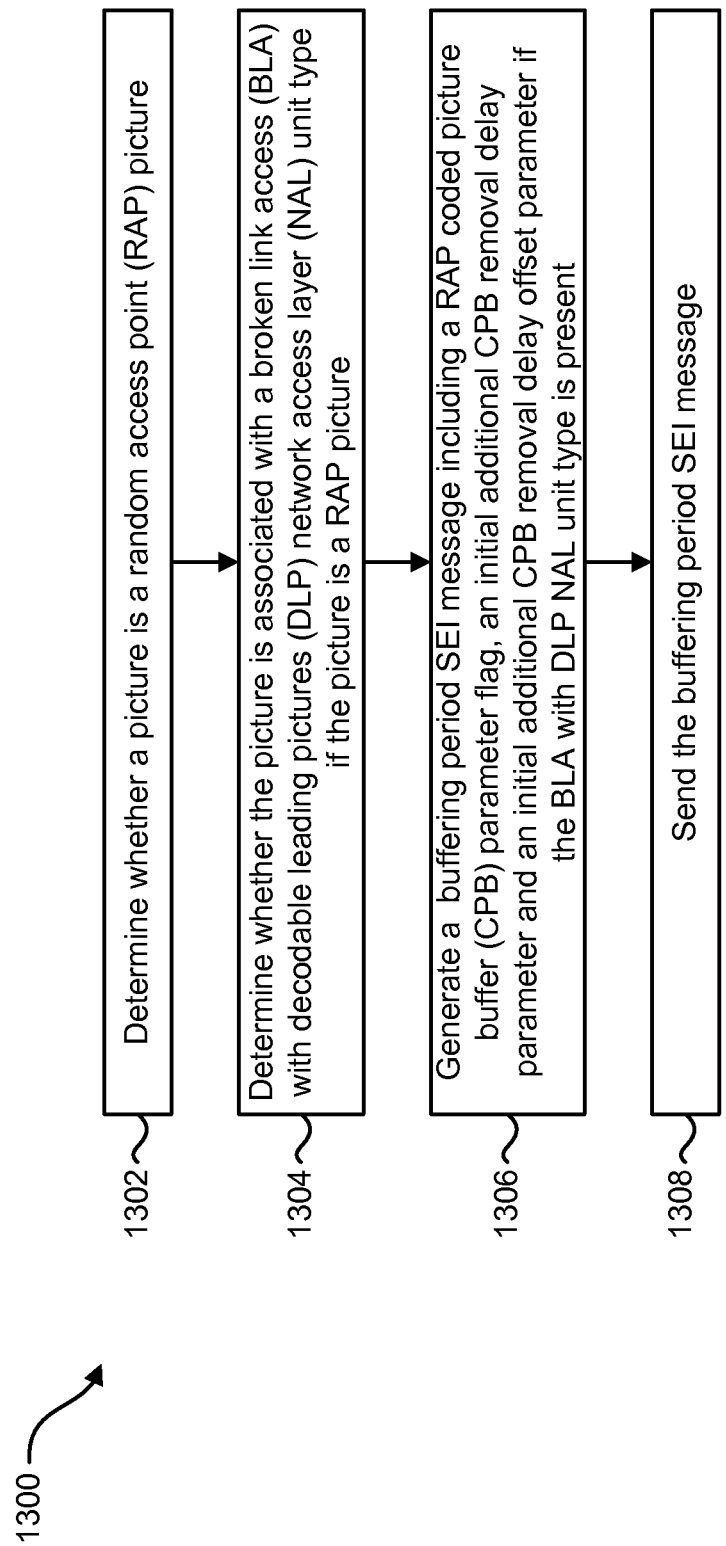
FIG. 13 is a flow diagram illustrating another more specific configuration of a method for sending a message.

FIG. 13 is a flow diagram illustrating another more specific configuration of a method 1300 for sending a message. An electronic device 102 (e.g., electronic device A 102a) may determine 1302 whether a picture is a random access point (RAP) picture. This may be accomplished as described in connection with FIG. 12 above.

The electronic device 102 may determine 1304 whether the picture is associated with a broken link access (BLA) with decodable leading pictures (DLP) network access layer (NAL) unit type if the picture is a RAP picture. This may be accomplished as described in connection with FIG. 12 above.

The electronic device 102 may generate 1306 a buffering period SEI message including whether the picture is associated with a broken link access (BLA) with decodable leading pictures (DLP) network access layer (NAL) unit type if the picture is a RAP picture. For example, the electronic device 102 may generate 1306 a buffering period SEI message that includes a rap_cpb_params_present_flag, an initial_alt1_cpb_removal_delay[SchedSelIdx] and initial_alt1_cpb_removal_delay_offset[SchedSelIdx]. In another example, a flag other than rap_cpb_params_present_ flag may be included in the message when the additional initial CPB removal delay offset parameter is included in the message. It should be noted that since rap_cpb_params_present_flag already existed, it may be reused in this example. In addition, another flag signaling this additional parameter may be sent. For example, the RAP CPB parameter flag may be a new parameter flag. In other words, the RAP CPB parameter flag may be another flag other than rap_cpb_params_present_flag.

The electronic device 102 may generate 1306 a buffering period SEI message. One example of this is illustrated in Table (2) above.

The electronic device 102 may send 1308 the buffering period SEI message. For example, the electronic device 102 may transmit the buffering period SEI message via one or more of wireless transmission, wired transmission, device bus, network, etc. For instance, electronic device A 102a may transmit the buffering period SEI message to electronic device B 102b. The buffering period SEI message may be part of the bitstream 114, for example.

The buffering period SEI message may indicate multiple initial buffering parameters for random access. For example, the buffering period SEI message may include additional information regarding the initial buffering parameters that assist the HRD and the decoder 112 in decoding pictures. In this way, initial buffering latency when starting playback at a RAP picture may be reduced.

Additionally, buffering period SEI message may prevent buffing overflow and underflow when starting playback at a RAP picture. For example, buffing overflow and underflow may be prevented by using correct values for initial buffering as signaled in initial_alt1_cpb_removal_delay[SchedSelIdx] and initial_alt1_cpb_removal_delay_offset[SchedSelIdx]. This may occur when Access Unit 0 is a BLA access unit for which the coded picture has nal_unit_type equal to BLA_W_DLP. However, if an incorrect value of buffering is used for initialization, then a buffer underflow and/or overflow can occur.

Figure 14:
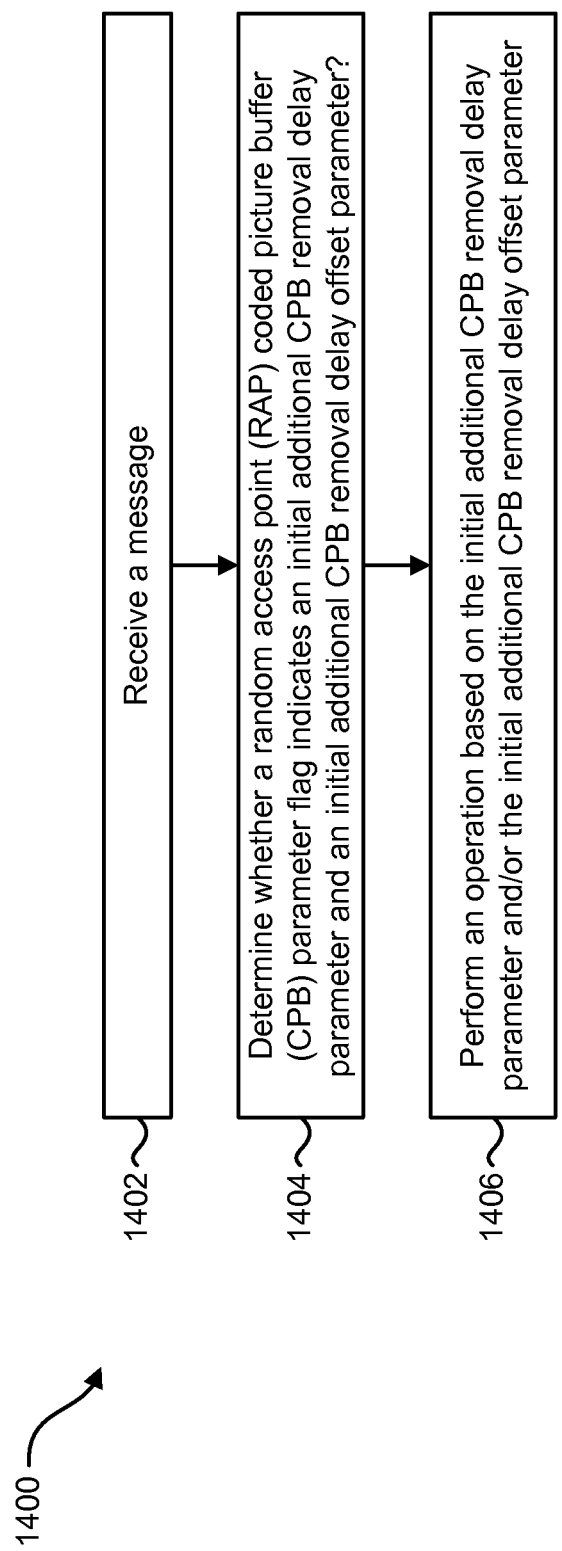
FIG. 14 is a flow diagram illustrating another configuration of a method for buffering a bitstream.

FIG. 14 is a flow diagram illustrating another configuration of a method 1400 for buffering a bitstream. An electronic device 102 (e.g., electronic device B 102b) may receive 1402 a message (e.g., a buffering period SEI message or other message). For example, the electronic device 102 may receive 1402 the message via one or more of wireless transmission, wired transmission, device bus, network, etc. For instance, electronic device B 102b may receive 1402 the message from electronic device A 102a. The message may be part of the bitstream 114, for example. In another example, electronic device B 102b may receive the message from electronic device A 102a in a separate transmission 110 (that is not part of the bitstream 114, for example). For instance, the message may be received using some out-of-band mechanism.

In some configurations, the message may include one or more of a RAP CPB parameter flag, an initial additional CPB removal delay parameter and an initial additional CPB removal delay offset parameter. Thus, receiving 1402 the message may include receiving one or more of a RAP CPB parameter flag, an initial additional CPB removal delay parameter and an initial additional CPB removal delay offset parameter.

Additional and/or alternative initial buffering parameter sets may be employed. For example, Table (2) illustrates initial_cpb_removal_delay, initial_alt_cpb_removal_delay and initial_alt1_cpb_removal_delay along with initial_cpb_removal_delay_offset, initial_alt_cpb_removal_delay_ offset and initial_alt1_cpb_removal_delay_offset, respectively. However, it should be appreciated that even more additional and/or alternative initial buffering parameter sets at a RAP picture may be added and employed. For example, initial_alt2_cpb_removal_delay, initial_alt3_cpb_removal_delay, initial_alt4_cpb_removal_delay_offset along with initial_alt2_cpb_removal_delay_offset, initial_alt3_cpb_removal_delay, initial_alt4_cpb_removal_delay_offset, respectively, may be employed. Then, the correct set of these parameters may be used based on the NAL unit type of the random access point picture.

The electronic device 102 may determine 1404 whether a random access point (RAP) coded picture buffer (CPB) parameter flag indicates an initial additional CPB removal delay parameter. For example, the RAP CPB parameter flag may be a Boolean value that equals 1 when an initial additional CPB removal delay parameter is present and equals 0 when an initial additional CPB removal delay parameter is not present. In some configurations, the RAP CPB parameter flag may also indicate the presence of an initial alternative CPB removal delay parameter.

The electronic device 102 may determine 1404 that the RAP CPB parameter flag indicates that an initial additional CPB removal delay parameter is present. Alternatively, the electronic device 102 may determine 1404 that the RAP CPB parameter flag indicates that an initial additional CPB removal delay parameter is not present. In some configurations, the electronic device 102 may determine 1404, based on the RAP CPB parameter flag missing that an initial additional CPB removal delay parameter is not present.

The electronic device 102 may perform 1406 an operation based on the initial CPB removal delay parameter. For example, the HRD or decoder 112 may employ the initial additional CPB removal delay parameter to determine the timing of the decoding unit removal and for decoding of the decoding units. The initial additional CPB removal delay parameter also assists in determining constraints on the bitstream arrival and assists a bitstream conformance checking entity to check if the generated bitstream will cause an overflow and/or underflow of HRD buffer or decoder 112.

Figure 15:
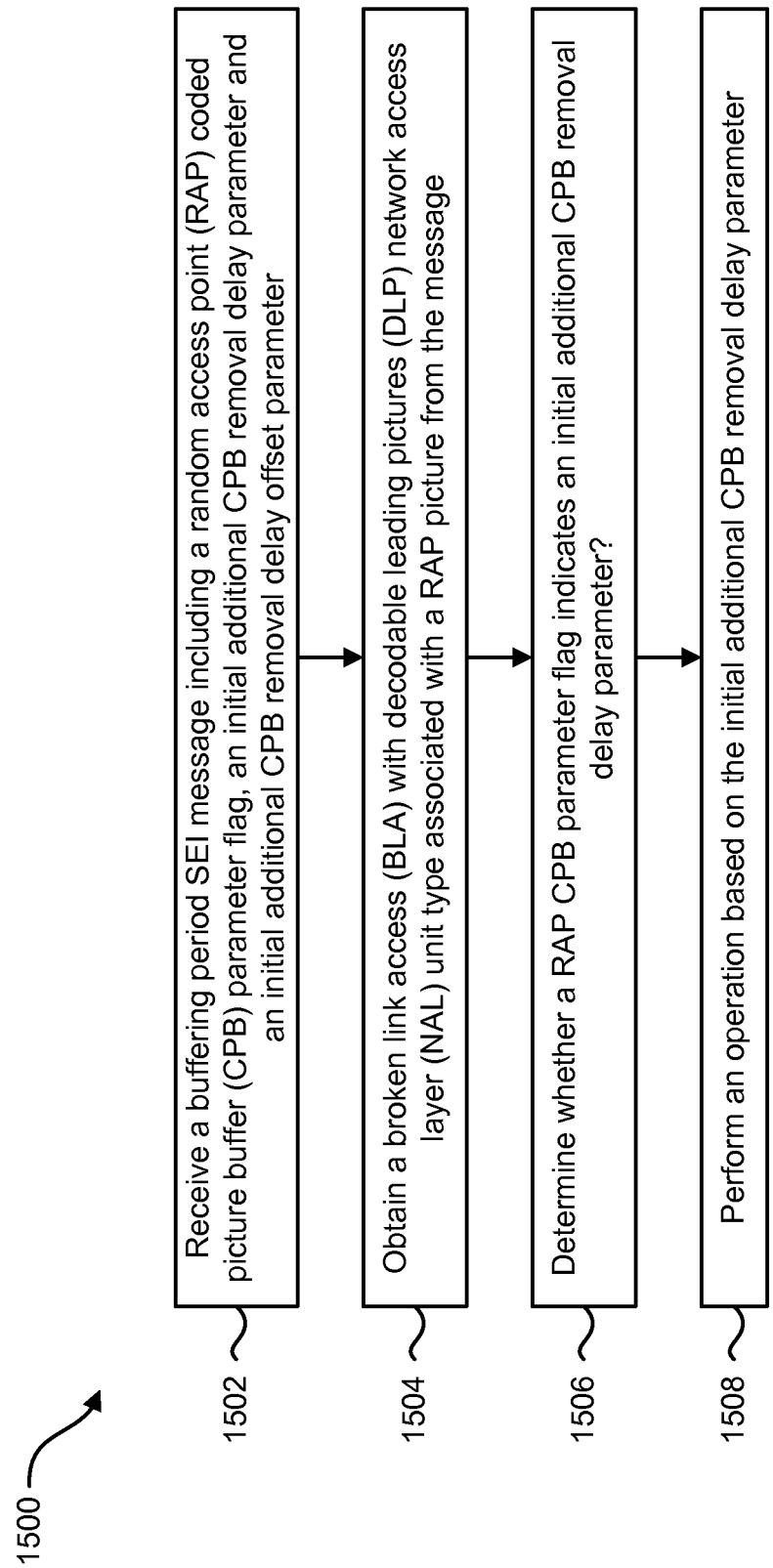
FIG. 15 is a flow diagram illustrating another more specific configuration of a method for buffering a bitstream.

FIG. 15 is a flow diagram illustrating another more specific configuration of a method 1500 for buffering a bitstream. An electronic device 102 (e.g., electronic device B 102b) may receive 502 a buffering period SEI message. For example, the electronic device 102 may receive 1502 the buffering period SEI message via one or more of wireless transmission, wired transmission, device bus, network, etc. For instance, electronic device B 102b may receive 1402 the buffering period SEI message from electronic device A 102a. The buffering period SEI message may be part of the bitstream 114, for example. The buffering period SEI message from electronic device A 102a in a separate transmission 110 (that is not part of the bitstream 114, for example). For instance, the buffering period SEI message may be received using some out-of-band mechanism.

The buffering period SEI message may include a RAP CPB parameter flag, an initial additional CPB removal delay parameter and an initial additional CPB removal delay offset parameter. Thus, the electronic device 102 may receive 1502 a buffering period SEI message may including a RAP CPB parameter flag, an initial additional CPB removal delay parameter and an initial additional CPB removal delay offset parameter.

The electronic device 102 may obtain 1504 a broken link access (BLA) with decodable leading pictures (DLP) network access layer (NAL) unit type associated with a picture from the message. For example, the picture may have associated TFD pictures present in the bitstream, but may have associated DLP pictures in the bitstream. BLA with DLP NAL unit type may be BLA_W_DLP. The picture may not have associated TFD pictures present in the bitstream, but may have associated DLP pictures in the bitstream. In some configurations, the picture may be a BLA picture.

The electronic device 102 may determine 1506 whether a RAP CPB parameter flag indicates an initial additional CPB removal delay parameter. The electronic device 102 may determine 1404 that the RAP CPB parameter flag indicates that an initial additional CPB removal delay parameter and an initial additional CPB removal delay offset parameter is present. Alternatively, the electronic device 102 may determine 1404 that the RAP CPB parameter flag indicates that an initial additional CPB removal delay parameter and an initial additional CPB removal delay offset parameter is not present. In some configurations, the RAP CPB parameter flag may also indicate the presence of an initial alternative CPB removal delay parameter.

The electronic device 102 may perform 1508 an operation based on the initial CPB removal delay parameter and/or the initial additional CPB removal delay offset parameter. This may be accomplished as described above in connection with FIG. 14, for example.

Figure 16:
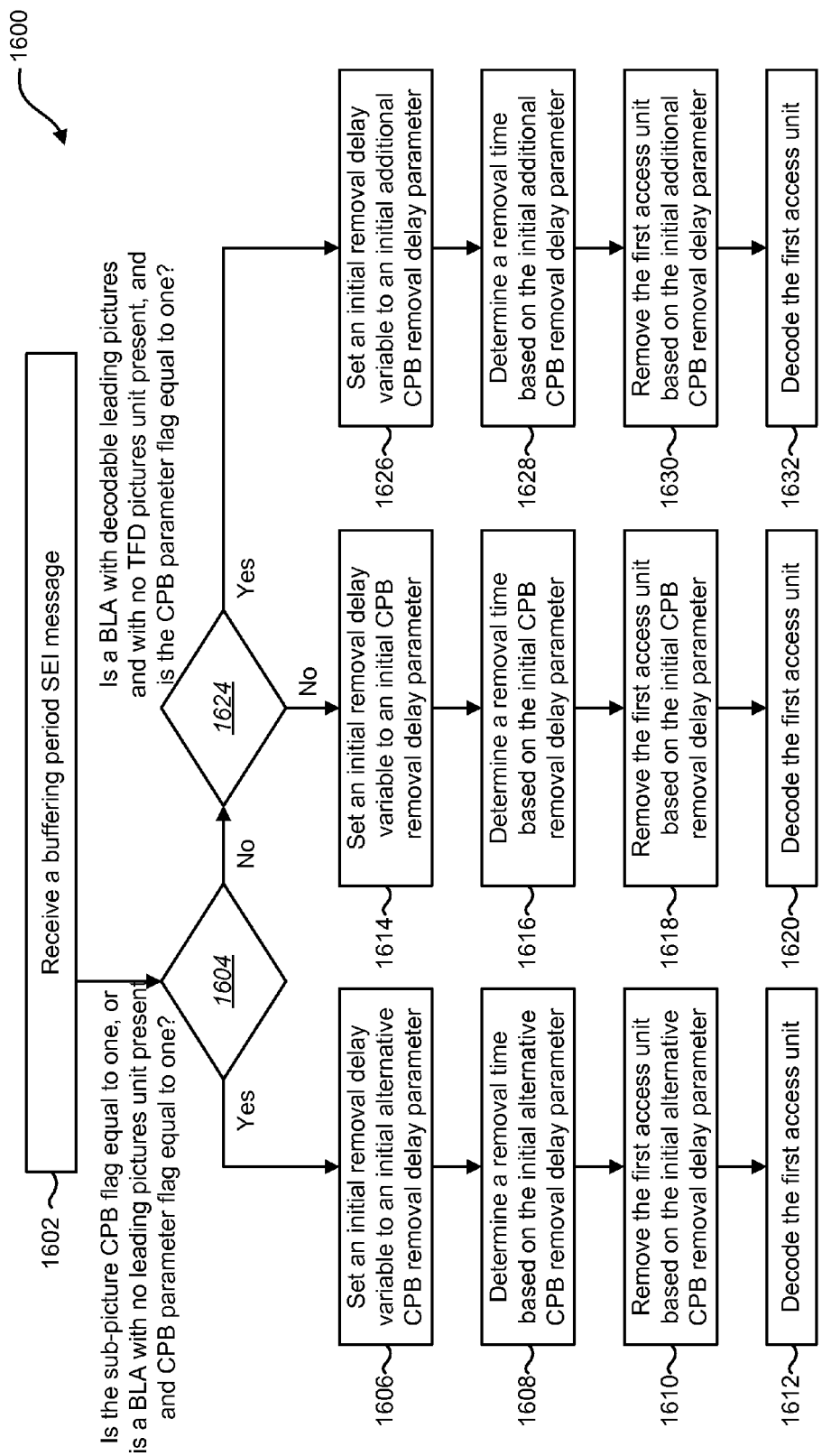
FIG. 16 is a flow diagram illustrating yet another configuration of a method for buffering a bitstream.

FIG. 16 is a flow diagram illustrating yet another configuration of a method 1600 for buffering a bitstream. An electronic device 102 (e.g., electronic device B 102b) may receive 1602 a buffering period SEI message. This may be accomplished as described above in connection with FIG. 14, for example.

In some configurations, the buffering period SEI message may include a RAP CPB parameter flag, a sub-picture CPB flag, a BLA with no leading pictures unit and/or a BLA with decodable leading pictures and with no TFD pictures unit. Thus, the electronic device 102 may receive 1502 a buffering period SEI message including a RAP CPB parameter flag, a sub-picture CPB flag, a BLA with no leading pictures NAL unit and/or a BLA with decodable leading pictures and with no TFD pictures NAL unit. For example, a BLA with no leading pictures NAL unit may be a BLA_N_LP NAL unit. A BLA with decodable leading pictures and with no TFD pictures NAL unit may be a BLA_W_DLP NAL unit The electronic device 102 may determine 1604 whether the sub-picture CPB flag is equal to one, or whether a BLA with no leading pictures NAL unit is present and the CPB parameter flag is equal to one. The sub-picture CPB flag is equal to one if SubPicCpbFlag==1. The CPB parameter flag is equal to one if rap_cpb_params_present_flag==1. Additionally, a BLA with no leading pictures may have no pictures following it.

If the electronic device 102 determines that the sub-picture CPB flag is equal to one or if a BLA with no leading pictures NAL unit is present and the CPB parameter flag is equal to one, then the electronic device 102 may set 1606 an initial removal delay variable to an initial alternative CPB removal delay parameter. In this case, for example, the electronic device 102 may set use_initial_cpb_removal_delay[SchedSelIdx] to the value of initial_alt_cpb_removal_delay[SchedSelIdx].

In some configurations, the electronic device 102 may determine a bitstream arrival time based on one or more of the initial alternative CPB removal delay parameter and the initial alternative CPB removal delay offset parameter.

If the electronic device 102 determines that the sub-picture CPB flag is equal to one or if a BLA with no leading pictures unit is present and the CPB parameter flag is equal to one, then the electronic device 102 may determine 1608 a removal time (e.g., $t_{r,n}$) based on the initial alternative CPB removal delay parameter. This may be accomplished as described above in connection with initial_alt_cpb_removal_delay[SchedSelIdx]÷90000.

If the electronic device 102 determines that the sub-picture CPB flag is equal to one or if a BLA with no leading pictures unit is present and the CPB parameter flag is equal to one, then the electronic device 102 may remove 1610 the first access unit based on the initial alternative CPB removal delay parameter. For example, the electronic device 102 may determine 1608 a removal time (e.g., $t_{r,n}$) for the first access unit based on the initial alternative CPB removal delay parameter (e.g., initial_alt_cpb_removal_delay[SchedSelIdx]) as described above. When the removal time (e.g., $t_{r,n}$) arrives, the electronic device 102 may remove 1610 the first access unit from the CPB, for instance.

The electronic device 102 may decode 1612 the first access unit. For example, the electronic device 102 may decode 1612 an encoded picture included in the first access unit. For example, the data associated with each access unit may be removed and decoded instantaneously by an instantaneous decoding process at CPB removal time.

If the electronic device 102 determines that the sub-picture CPB flag is not equal to one, or if a BLA with no leading pictures unit is not present, then the electronic device 102 determine 1624 whether a BLA with decodable leading pictures and with no TFD pictures unit is present, and whether the CPB parameter flag is equal to one.

If a BLA with decodable leading pictures and with no TFD pictures unit is not present, and the CPB parameter flag is not equal to one, then the electronic device 102 may set 1614 an initial removal delay variable to an initial CPB removal delay parameter. In this case, for example, the electronic device 102 may set use_initial_cpb_removal_delay[SchedSelIdx] to the value of initial_cpb_removal_delay[SchedSelIdx].

If the first access unit is not a CRA access unit, if the first access unit is a CRA access unit and a leading picture is present or if the CRA picture discard flag does not indicate discard, then the electronic device 102 may determine 1616 a removal time (e.g., $t_{r,n}$) based on the initial CPB removal delay parameter. This may be accomplished as described above in connection with initial_cpb_removal_delay[SchedSelIdx]÷90000.

If the first access unit is not a CRA access unit, if the first access unit is a CRA access unit and a leading picture is present or if the CRA picture discard flag does not indicate discard, then the electronic device 102 may remove 1618 the first access unit based on the initial CPB removal delay parameter. For example, the electronic device 102 may determine 1616 a removal time (e.g., $t_{r,n}$) for the first access unit based on the initial CPB removal delay parameter (e.g., initial_cpb_removal_delay[SchedSelIdx]) as described above. When the removal time (e.g., $t_{r,n}$) arrives, the electronic device 102 may remove 1618 the first access unit from the CPB, for instance.

The electronic device 102 may decode 1620 the first access unit. For example, the electronic device 102 may decode 1620 an encoded picture included in the first access unit. For example, the data associated with each access unit may be removed and decoded instantaneously by an instantaneous decoding process at CPB removal time.

If the electronic device 102 determines that a BLA with decodable leading pictures and with no TFD pictures unit is present, and the CPB parameter flag is equal to one, then the electronic device 102 may set 1626 an initial removal delay variable to an initial additional CPB removal delay parameter. In this case, for example, the electronic device 102 may set use_initial_cpb_removal_delay[SchedSelIdx] to the value of initial_alt1_cpb_removal_delay[SchedSelIdx].

In some configurations, the electronic device 102 may determine a bitstream arrival time based on one or more of the initial additional CPB removal delay parameter and the initial additional CPB removal delay offset parameter.

If the electronic device 102 determines that a BLA with decodable leading pictures and with no TFD pictures unit is present, and the CPB parameter flag is equal to one, then the electronic device 102 may determine 1628 a removal time (e.g., $t_{r,n}$) based on the initial additional CPB removal delay parameter. This may be accomplished as described above in connection with initial_alt1_cpb_removal_delay[SchedSelIdx]÷90000.

If the electronic device 102 determines that a BLA with decodable leading pictures and with no TFD pictures unit is present, and the CPB parameter flag is equal to one, then the electronic device 102 may remove 1630 the first access unit based on the initial additional CPB removal delay parameter. For example, the electronic device 102 may determine 1628 a removal time (e.g., $t_{r,n}$) for the first access unit based on the initial additional CPB removal delay parameter (e.g., initial_alt1_cpb_removal_delay[SchedSelIdx]) as described above. When the removal time (e.g., $t_{r,n}$) arrives, the electronic device 102 may remove 1630 the first access unit from the CPB, for instance.

The electronic device 102 may decode 1632 the first access unit. For example, the electronic device 102 may decode 1632 an encoded picture included in the first access unit. For example, the data associated with each access unit may be removed and decoded instantaneously by an instantaneous decoding process at CPB removal time.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for sending a buffering period Supplemental Enhancement Information (SEI) message by an electronic device, comprising:

coding first initial CPB removal delay parameters, a flag which indicates whether second initial CPB removal delay parameters are present, and second initial CPB removal delay parameters when the flag indicates its presence, wherein initial removal delay variables is set to second initial CPB removal delay parameters when a set of conditions is met, and initial removal delay variables is set to first initial CPB removal delay parameters when the set of conditions is not met, and sending the buffering period Supplemental Enhancement Information (SEI) message, said set of conditions includes the first access unit in decoding order is a CRA access unit and the flag is equal to 1.

* * * * *